(12) United States Patent
Dettling et al.

(10) Patent No.: US 6,340,066 B1
(45) Date of Patent: *Jan. 22, 2002

(54) POLLUTANT TREATING DEVICES AND METHODS OF MAKING THE SAME

(75) Inventors: Joseph C. Dettling, Howell; John J. Steger, Pittstown; Michael Spencer, Somerset, all of NJ (US); Robert V. Russo, Brooklyn, NY (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/588,972

(22) Filed: Jan. 19, 1996

Related U.S. Application Data

(63) Continuation-in-part of application No. 08/537,208, filed on Sep. 29, 1995, now abandoned, which is a continuation-in-part of application No. 08/537,206, filed on Sep. 29, 1995, now abandoned, which is a continuation-in-part of application No. 08/410,445, filed on Mar. 24, 1995, now abandoned, which is a continuation-in-part of application No. 08/376,332, filed on Jan. 20, 1995, now abandoned.

(51) Int. Cl.⁷ ............................................... B62D 63/02
(52) U.S. Cl. ...................... 180/54.1; 180/68.4; 55/356; 55/385.3; 96/228; 423/210
(58) Field of Search .................. 55/242, 356, 385.3, 55/DIG. 31; 123/198 R, 198 E; 96/228; 180/54.1, 68.4; 423/210

(56) References Cited

U.S. PATENT DOCUMENTS

| 1,484,782 | A | 2/1924 | Heise | |
|---|---|---|---|---|
| 1,628,344 | A | 5/1927 | Walsh | |
| 1,863,015 | A | 6/1932 | Kamrath | |
| 1,937,488 | A | 11/1933 | Jenness | 23/234 |
| 1,937,489 | A | 11/1933 | Jenness | 23/234 |
| 2,213,017 | A | 8/1940 | Perkins | 98/2 |
| 2,455,734 | A | 12/1948 | Clausen | 183/53 |
| 2,473,563 | A | 6/1949 | Beja et al. | 23/145 |
| 2,551,823 | A | 5/1951 | Buttner et al. | 237/28 |
| 2,658,742 | A | 11/1953 | Suter et al. | 263/3 |
| 2,701,104 | A | 2/1955 | Fox | 241/3 |
| 2,956,860 | A | 10/1960 | Welsh | 23/145 |
| 2,966,339 | A | 12/1960 | Morgan | 257/1 |
| 3,110,300 | A | 11/1963 | Brown et al. | 126/109 |
| 3,147,100 | A | 9/1964 | Wilber | 55/419 |
| 3,242,013 | A | 3/1966 | Mehne et al. | 136/138 |

(List continued on next page.)

FOREIGN PATENT DOCUMENTS

| DE | 822 053 | 11/1951 |
|---|---|---|
| DE | 1067691 | 10/1959 |
| DE | 1095128 | 12/1960 |

(List continued on next page.)

OTHER PUBLICATIONS

Additives for Dispersion Technology, published by Rhone Poulenc.

Outside submission from Attorney Conrad O. Gardner in the Application of A System for Ambient Air Pollution Processing by Motor Vehicles.

(List continued on next page.)

Primary Examiner—Steven P. Griffin
Assistant Examiner—Timothy C Vanoy

(57) ABSTRACT

A pollutant treating device especially adapted for motor vehicles in which a housing containing a catalyst composition for treating pollutants is positioned within the normal flow pattern of ambient air within the motor vehicle and is preferably removably placed within a support, such as a bracket assembly where the housing can be readily removed and replaced and/or reused.

5 Claims, 10 Drawing Sheets

U.S. PATENT DOCUMENTS

| | | | | |
|---|---|---|---|---|
| 3,269,890 | A | 8/1966 | Boberg et al. | 23/238 |
| 3,356,452 | A | 12/1967 | Moore | 23/145 |
| 3,414,440 | A | 12/1968 | Moore | 136/107 |
| 3,565,203 | A | 2/1971 | Ashton et al. | |
| 3,596,441 | A | 8/1971 | Luedahl | 55/376 |
| 3,640,683 | A | 2/1972 | Miyazaki et al. | 23/145 |
| 3,685,983 | A | 8/1972 | Louzos | 75/5 R |
| 3,738,088 | A | 6/1973 | Colosimo | 55/104 |
| 3,770,868 | A | 11/1973 | Swinkels et al. | 423/50 |
| 3,823,533 | A | 7/1974 | Alverson et al. | 55/493 |
| 3,837,149 | A | 9/1974 | West et al. | |
| 3,859,788 | A | 1/1975 | King et al. | 60/280 |
| 3,864,118 | A | 2/1975 | Schumacher et al. | 75/3 |
| 3,883,637 | A | 5/1975 | Benedict | 423/230 |
| 3,915,837 | A | 10/1975 | Feige, Jr. | 204/286 |
| 3,959,021 | A | 5/1976 | Nishino et al. | 136/138 |
| 3,993,597 | A | 11/1976 | Stiles | 252/454 |
| 4,006,217 | A | 2/1977 | Faber et al. | 423/605 |
| 4,007,875 | A | 2/1977 | Stolz et al. | 237/12.3 A |
| 4,089,928 | A | 5/1978 | Foroglou | 423/49 |
| 4,101,296 | A | 7/1978 | Lowther | 55/33 |
| 4,141,963 | A | 2/1979 | Miller | 423/592 |
| 4,171,211 | A | 10/1979 | Carter | 55/493 |
| 4,173,549 | A | 11/1979 | Kent et al. | 252/463 |
| 4,184,983 | A | 1/1980 | Putz et al. | 252/466 PT |
| 4,195,606 | A | 4/1980 | Wallis, Jr. et al. | 123/119 |
| 4,197,366 | A | 4/1980 | Tamura et al. | 429/197 |
| 4,200,609 | A | 4/1980 | Byrd | 422/122 |
| 4,206,083 | A | 6/1980 | Chang | 252/455 R |
| 4,207,291 | A | 6/1980 | Byrd et al. | 422/122 |
| 4,234,326 | A | 11/1980 | Bailey et al. | 55/278 |
| 4,246,253 | A | 1/1981 | Hunter | 423/605 |
| 4,261,863 | A | 4/1981 | Kent et al. | 252/463 |
| 4,277,360 | A | 7/1981 | Mellors et al. | 252/182.1 |
| 4,284,618 | A | 8/1981 | Van der Heyden et al. | 423/605 |
| 4,285,913 | A | 8/1981 | Soni et al. | 423/50 |
| 4,302,490 | A | 11/1981 | Byrd | 427/301 |
| 4,310,494 | A | 1/1982 | Welsh | 423/49 |
| 4,348,360 | A | 9/1982 | Chang et al. | 422/122 |
| 4,352,321 | A | 10/1982 | Fukui et al. | 98/2.11 |
| 4,363,787 | A | 12/1982 | Yoon | 422/201 |
| 4,379,129 | A | 4/1983 | Abe | 423/210 |
| 4,379,817 | A | 4/1983 | Kozawa | 429/224 |
| 4,399,185 | A | 8/1983 | Petrow | 428/253 |
| 4,402,931 | A | 9/1983 | Tanabe et al. | 423/605 |
| 4,405,699 | A | 9/1983 | Kruger | 429/224 |
| 4,425,145 | A | 1/1984 | Reese | 55/385 B |
| 4,476,104 | A | 10/1984 | Mellors | 423/605 |
| 4,477,541 | A | 10/1984 | Fraioli | 429/33 |
| 4,483,828 | A | 11/1984 | Laughlin et al. | 423/49 |
| 4,485,073 | A | 11/1984 | Robertson et al. | 423/49 |
| 4,489,043 | A | 12/1984 | Bowerman et al. | 423/49 |
| 4,551,254 | A | 11/1985 | Imada et al. | 210/688 |
| 4,579,723 | A | 4/1986 | Weltmer et al. | 423/219 |
| 4,581,219 | A | 4/1986 | Imada et al. | 423/605 |
| 4,585,718 | A | 4/1986 | Uedaira et al. | 429/224 |
| 4,590,059 | A | 5/1986 | Mellors | 423/605 |
| 4,595,643 | A | 6/1986 | Koshiba et al. | 429/27 |
| 4,604,336 | A | 8/1986 | Nardi | 429/224 |
| 4,619,821 | A | 10/1986 | Ely | 423/579 |
| 4,657,887 | A | 4/1987 | Hardman et al. | 502/303 |
| 4,662,065 | A | 5/1987 | Marincic et al. | 29/623.1 |
| 4,665,973 | A | 5/1987 | Limberg et al. | 165/133 |
| 4,670,474 | A | 6/1987 | Hinnenkamp et al. | 518/713 |
| 4,684,381 | A | 8/1987 | Wasylyniuk | 55/316 |
| 4,733,605 | A | 3/1988 | Hölter et al. | 98/2.11 |
| 4,734,113 | A | 3/1988 | Takagi et al. | 55/504 |
| 4,742,038 | A | 5/1988 | Matsumoto | 502/303 |
| 4,818,354 | A | 4/1989 | Preisler et al. | 204/96 |
| 4,824,363 | A | 4/1989 | Abthoff et al. | 432/222 |
| 4,838,910 | A | 6/1989 | Stollenwerk et al. | 55/385.2 |
| 4,871,709 | A | 10/1989 | Tatsushima et al. | 502/324 |
| 4,909,815 | A | 3/1990 | Meyer | 55/316 |
| 4,921,689 | A | 5/1990 | Walker et al. | 423/605 |
| 4,961,762 | A | 10/1990 | Howeth | 55/302 |
| 4,975,346 | A | 12/1990 | Lecerf et al. | 429/197 |
| 5,004,487 | A | 4/1991 | Kowalczyk | |
| 5,080,882 | A | 1/1992 | Yoshimoto et al. | 423/579 |
| 5,082,570 | A | 1/1992 | Higgins et al. | 210/683 |
| 5,085,266 | A | 2/1992 | Arold et al. | 165/1 |
| 5,092,396 | A | 3/1992 | Murano et al. | 165/119 |
| 5,113,836 | A | 5/1992 | Sweeten | 123/573 |
| 5,130,109 | A | 7/1992 | Wan | 423/213 |
| 5,142,864 | A | 9/1992 | Dunne | 60/274 |
| 5,145,657 | A | 9/1992 | Kobayashi et al. | 423/219 |
| 5,145,822 | A | 9/1992 | Falke et al. | 502/150 |
| 5,147,429 | A | 9/1992 | Bartholomew et al. | 55/356 |
| 5,160,586 | A | 11/1992 | Yoshimoto et al. | 204/59 R |
| 5,162,274 | A | 11/1992 | Deitz | 502/51 |
| 5,176,833 | A | 1/1993 | Vaughn et al. | 210/638 |
| 5,180,502 | A | 1/1993 | Nishiki et al. | 210/748 |
| 5,187,137 | A | 2/1993 | Terui et al. | 502/241 |
| 5,194,233 | A | 3/1993 | Kitahara et al. | 423/210 |
| 5,212,140 | A | 5/1993 | Yoshimoto et al. | 502/300 |
| 5,214,014 | A | 5/1993 | Yoshimoto et al. | 502/84 |
| 5,221,649 | A | 6/1993 | Yoshimoto et al. | 502/84 |
| 5,221,652 | A | 6/1993 | Tierney et al. | 502/170 |
| 5,227,144 | A | 7/1993 | Perez de la Garza | 423/210 |
| 5,232,882 | A | 8/1993 | Yoshimoto et al. | 502/5 |
| 5,232,886 | A | 8/1993 | Yoshimoto et al. | 502/84 |
| 5,250,487 | A | 10/1993 | Wirtz et al. | 502/243 |
| 5,252,299 | A | 10/1993 | Retallick | 422/174 |
| 5,262,129 | A | 11/1993 | Terada et al. | 422/122 |
| 5,277,890 | A | 1/1994 | Wang et al. | 423/605 |
| 5,283,041 | A | 2/1994 | Nguyen et al. | 423/240 |
| 5,283,139 | A | 2/1994 | Newman et al. | 429/224 |
| 5,294,499 | A | 3/1994 | Furukawa et al. | 429/164 |
| 5,296,435 | A | 3/1994 | Kitaguchi et al. | 502/174 |
| 5,308,591 | A | 5/1994 | Whittenberger | 422/174 |
| 5,340,562 | A | 8/1994 | O'Young et al. | 423/599 |
| 5,348,726 | A | 9/1994 | Wang et al. | 423/605 |
| 5,356,457 | A | 10/1994 | Pincheira Alvarez et al. | 75/710 |
| 5,382,417 | A | 1/1995 | Haase | 423/219 |
| 5,391,365 | A | 2/1995 | Wang et al. | 423/605 |
| 5,395,534 | A | 3/1995 | Smith | 210/688 |
| 5,401,477 | A | 3/1995 | Cawlfield et al. | 423/50 |
| 5,405,594 | A | 4/1995 | Andersen et al. | 423/605 |
| 5,411,643 | A | 5/1995 | Cawlfield et al. | 204/115 |
| 5,419,882 | A | 5/1995 | Jibiki | 423/111 |
| 5,422,331 | A | 6/1995 | Galligan et al. | 502/333 |
| 5,433,772 | A | 7/1995 | Sikora | 96/87 |
| 5,447,693 | A | 9/1995 | Ohta et al. | 422/122 |
| 5,620,672 | A | 4/1997 | Galligan et al. | 423/219 |
| 5,676,913 | A | * 10/1997 | Cirillo et al. | 423/219 |

FOREIGN PATENT DOCUMENTS

| | | | |
|---|---|---|---|
| DE | 1101160 | 12/1960 | |
| DE | 1133154 | 7/1962 | |
| DE | 2155738 | 1/1973 | B60H/3/06 |
| DE | 25 49 621 B2 | 5/1977 | |
| DE | 25 49 621 A1 | 5/1977 | H01M/4/90 |
| DE | 30 19 828 | 11/1980 | C09D/7/12 |
| DE | 33 34 992 A1 | 4/1985 | B60H/3/00 |
| DE | 37 13 035 A1 | 10/1988 | B65D/90/28 |
| DE | 40 07 964 A1 | 9/1991 | B01J/23/72 |
| DE | 40 07 965 A1 | 9/1991 | B01J/23/84 |
| DE | 40 17 892 A1 | 12/1991 | |
| DE | 40 07 965 C2 | 3/1994 | B01J/23/72 |
| DE | 43 18 738 C1 | 7/1994 | B01D/53/36 |
| DE | G 94 15 457.0 | 11/1994 | |
| DE | 44 20 224 A1 | 1/1995 | B01D/53/86 |

| | | | | |
|---|---|---|---|---|
| DE | 44 23 329 A1 | 1/1995 | ............ | B01D/53/86 |
| DE | 94 15 457.0 | 1/1995 | ............ | B01D/53/86 |
| EP | 0 097 287 | 1/1984 | ............. | F28D/1/04 |
| EP | 097 287 | 1/1984 | ............. | F28D/1/04 |
| EP | 0 186 477 B1 | 7/1986 | ............. | F24F/3/12 |
| EP | 186 477 | 7/1989 | ............. | F24F/3/12 |
| EP | 351 036 | 1/1990 | ............ | B01J/35/02 |
| EP | 373 648 | 6/1990 | ............ | B01D/53/36 |
| EP | 0 431 648 A1 | 6/1991 | | |
| EP | 470 330 A1 | 2/1992 | ......... | F02M/35/024 |
| EP | 537 815 | 4/1993 | ............ | C10G/47/14 |
| EP | 0 561 484 A1 | 9/1993 | ............ | B01D/53/36 |
| EP | 0 634 205 A1 | 1/1995 | ............ | B01D/53/66 |
| EP | 0 635 685 A1 | 1/1995 | ............. | F24F/3/16 |
| EP | 0 653 956 B1 | 5/1995 | ............ | B01D/53/66 |
| EP | 0 666 776 B1 | 8/1995 | ............ | B01J/35/04 |
| GB | 2 009 392 | 6/1979 | ............. | F24F/7/06 |
| GB | 2 056 424 A | 3/1981 | | |
| GB | 2 056 424 B | 3/1981 | ............ | B01D/53/36 |
| GB | 2 110 174 A | 6/1983 | ............ | B60K/13/02 |
| GB | 2 218 354 A | 11/1989 | ............ | B01D/50/00 |
| JP | J74011141 B | 3/1915 | | |
| JP | 52148468 | 12/1977 | ............ | B01D/53/34 |
| JP | 55106813 | 8/1980 | ............ | B60H/1/24 |
| JP | 56059671 | 5/1981 | ............ | B01J/20/06 |
| JP | 57122924 | 7/1982 | ............ | B01D/53/36 |
| JP | 61035853 | 2/1986 | ............ | B01J/23/89 |
| JP | 3-229645 | 10/1991 | | |
| JP | 4110045 | 4/1992 | ............ | B01D/53/36 |
| JP | H4-176316 | 6/1992 | | |
| JP | H4-297341 | 10/1992 | | |
| JP | 4297341 | 10/1992 | ............. | B60P/3/00 |
| JP | 5-7776 | 1/1993 | | |
| JP | 405007776 A | 1/1993 | | |
| JP | 5023590 | 2/1993 | ............ | B01D/53/36 |
| JP | 5038443 | 2/1993 | ............ | B01J/23/89 |
| JP | H6-13204 | 1/1994 | | |
| RU | 1 703 173 A1 | 1/1992 | ............ | B01J/37/30 |
| WO | WO 90/11433 | 10/1990 | ............. | F01N/3/10 |
| WO | WO 93/05821 | 4/1993 | ............. | A61L/9/20 |
| WO | WO 94/27709 | 12/1994 | | |
| WO | WO 95/22395 | 8/1995 | ............ | B01D/57/75 |
| WO | WO 96/09109 | 3/1996 | ............ | B01D/53/88 |
| WO | WO 96/22146 | 7/1996 | ............ | B01D/53/68 |
| WO | WO 96/22148 | 7/1996 | ............ | B01D/53/88 |
| WO | WO 97/41948 | 11/1997 | ............ | B01D/53/86 |
| WO | WO 98/06479 | 2/1998 | ............ | B01D/53/86 |
| WO | WO 98/06480 | 2/1998 | ............ | B01D/53/86 |

OTHER PUBLICATIONS

Outside submission from Litman Law Offices, Ltd., in the Application of Leo K. Brown for an Environmental Air Filtration System for Vehicles.

Manganese Compounds, vol. 15, pp. 1003–1050.

SAE 931088 Calculation and Design of Cooling Systems by Eichiseder & Raab of Steyr Damler Puchag.

SAE 931089 Charge Air Cooler for Passenger Cars by Thierry Collette of Valeo Thermique Moteur.

SAE 931092 State of the Art & Future Developments of Aluminum Radiators for Cars & Trucks by Josef Kern & Jochen Eitel of Behr GmbH & Co.

SAE 931112 Air Mix versus Coolant Flow to Control Discharge Air Temperature in Vehicle Heating and Air Conditioning Systems by Gary Rolling and Robert Cummings of Behr of America, Inc. and Gebhard Schweizer of Behr GmbH & Co.

SAE 931115 Engine Cooling Module Development Using Air Flow Management Technique by Refki El–Bourini & Samuel Chen of Calsonic Technical Center.

SAE 931120 A New Zeolite Energy Storage Concept for Cooling & Heating Sleeping Cabins in Trucks by Manfred Nonnenman & Noureddine Khellifa of Behr GmbH & Co.

SAE 931121 Automotive Evaporator and Condenser Modeling by Francisco Castro, Francisco Tinaut & A.A. Rahman Ali of Universidad de Valladolid.

SAE 931125 Durability Concerns of Aluminum Air to Air Charge Air–Coolers by Paul Richard Smith of Valeo Engine Cooling, Inc.

Taylor, The Internal Combustion Engine in Theory and Practice, vol. I: Thermo Dynamics, Fluid Flow, Performance, Second Edition, Rev.

The MIT Press, 1985 at pp. 304–306 for radiator and fin design; and p. 392 for after coolers.

Newspaper Article with Informal Translation—Mobile Air Purification.

Newspaper Article with Informal Translation—Super–Kat in Cars ensures clean air forever.

O'Young, Hydrothermal Synthesis of Manganese Oxides with Tunnel Structures presented at the Symposium on Advances in Zeolites and Pillared Clay Structures presented before the Division of Petroleum ChePmistry, Inc. American Chemical Society New York City Meeting, Aug. 25–30, 1991 beginning at p. 348.

McKenzie, the Synthesis of Birnessite, Cryptomelane, and Some Other Oxides and Hydroxides of Manganese, Mineralogical Magazine, Dec. 1971, vol. 38, pp. 483–502.

Mark, et al., Kirk–Othmer Encyclopedia of Chemical Technology, Ed. 3, vol. 5, Castor Oil to Chlorosulfuric Acid, 1989, Wiley & Sons, NY, pp. 22–23, 40, 49–51.

Gerhartz, et al., Ullmann's Encyclopedia of Industrial Chemistry, Ed. 5, vol. A5, Cancer Chemotherapy to Ceramic Colorants, 1986, VCH Verlag, De, Weinheim, pp. 336, 347–353.

* cited by examiner

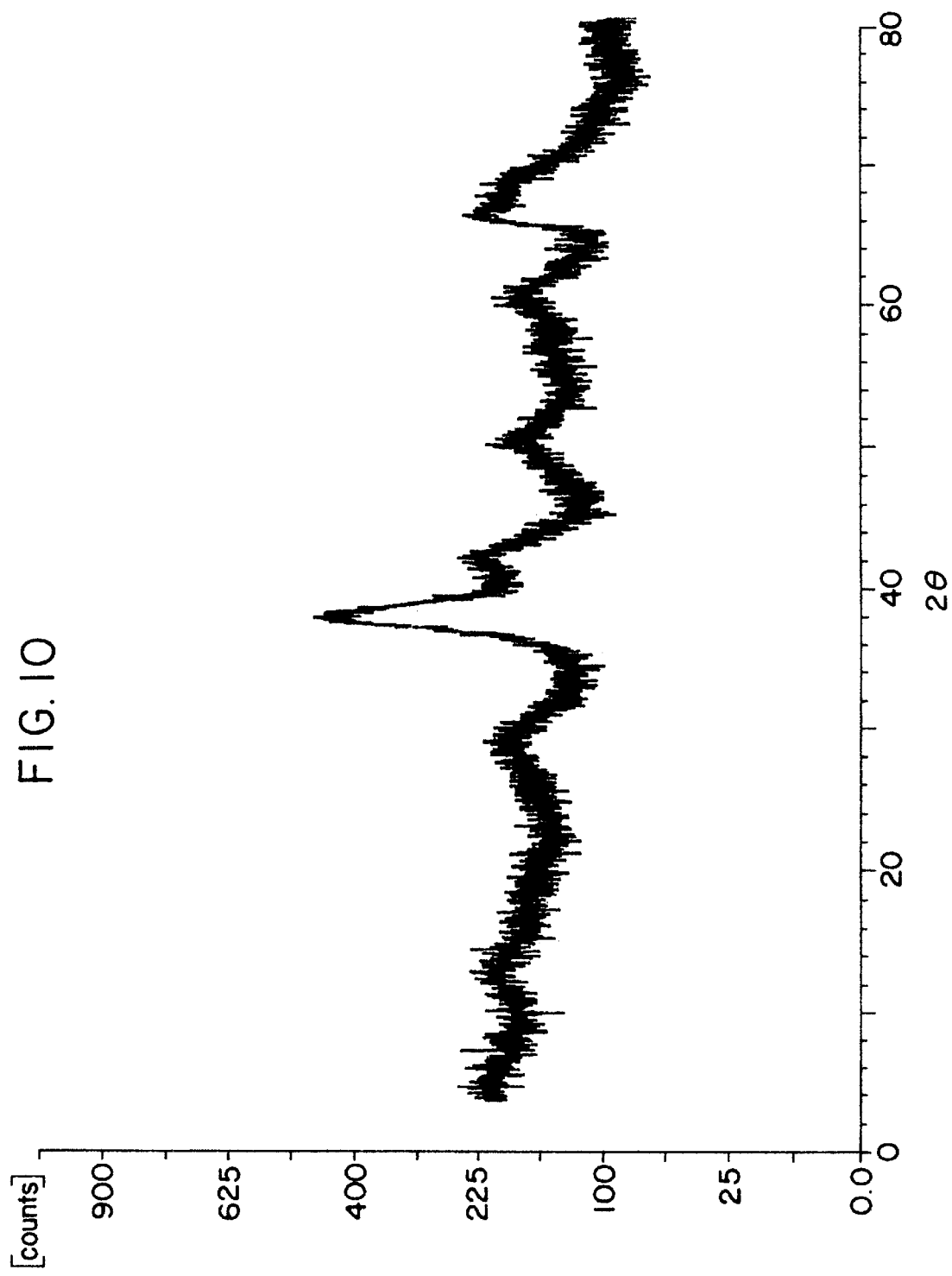

POLLUTANT TREATING DEVICES AND METHODS OF MAKING THE SAME

RELATED APPLICATION

This is a continuation-in-part application of U.S. Ser. No. 08/537,208 filed Sep. 29, 1995, now abandoned. It is also a continuation-in-part application of U.S. Ser. No. 08/537,206 filed Sep. 29, 1995, now abandoned, which is a continuation-in-part of U.S. Ser. No. 08/410,445 filed Mar. 24, 1995, now abandoned, which is a continuation-in-part of U.S. Ser. No. 08/376,332 filed Jan. 20, 1995, now abandoned, all of said applications are herein incorporated by reference.

FIELD OF THE INVENTION

The present invention is directed to a pollutant treating device for removing pollutants from a gas, especially ambient air flowing naturally through the engine compartment of a motor vehicle. The device contains a pollutant treating component including a catalyst and/or an adsorbent. The present invention is especially adapted to a renewable pollutant treating device used in automobiles which can be readily replaced and/or reused.

BACKGROUND OF THE INVENTION

The removal of pollutants from a gas (e.g. air) requires that the gas moves in proximity to a material that can either chemically convert the pollutants to non-toxic materials and/or absorb the pollutants so that the gas may be cleansed. In order to provide conditions for the removal of pollutants from gases, it is necessary to have a flow of air and in some cases a source of heat to elevate the temperature of the gas flow to above a critical temperature particularly when using catalysts to promote chemical conversion of the pollutants.

Such devices employ catalytic materials to convert pollutants to non-toxic materials. Such catalysts include noble metal catalysts (e.g. platinum, rhodium and the like) as well as the less expensive base metal catalysts such as copper, iron, manganese and the like.

Systems employing catalysts for the removal of pollutants from gasoline and diesel exhaust are commonplace in the auto industry. Catalytic converters are devices which contain a catalytic material to promote the chemical conversion of such pollutants including hydrocarbons, sulfur compounds and nitrogen compounds to produce non-toxic gases such as carbon dioxide, water vapor and the like. Catalytic converters of the type employed in the automotive industry to treat engine exhaust are expensive and not readily replaceable. Currently, the EPA does not permit individuals to remove catalytic converters from motor vehicles. They are typically provided with relatively high concentrations of very expensive catalysts so that replacement over the life of the automobile is preferably not necessary.

It is also known in the art to use adsorbents to entrap pollutants within a maze of interstitial spaces while allowing air to pass therethrough. Examples of such adsorbents include activated carbon, silica, zeolites and the like.

While catalytic converters in automobiles are used to treat exhaust, there are generally no provisions for treating ambient air to remove pollutants such as hydrocarbons, carbon monoxide and ozone contained therein. Such devices would have to be inexpensive compared to typical catalytic converters. Accordingly, the devices would have to employ generally less expensive catalytic materials and/or adsorbents and be readily replaceable and/or reusable.

It has been disclosed to treat atmospheric air directed into a confined space to remove undesirable components in the air. However, there has been little effort to treat pollutants which are already in the environment; the environment has been left to its own self cleansing systems. References are known which disclose proactively cleaning the environment. U.S. Pat. No. 3,738,088 discloses an air filtering assembly for cleaning pollution from the ambient air by utilizing a vehicle as a mobile cleaning device. A variety of elements are disclosed to be used in combination with a vehicle to clean the ambient air as the vehicle is driven through the environment. In particular, there is disclosed ducting to control air stream velocity and direct the air to various filter means. The filter means can include filters and electronic precipitators. Catalyzed postfilters are disclosed to be useful to treat nonparticulate or aerosol pollution such as carbon monoxide, unburned hydrocarbons, nitrous oxide and/or sulfur oxides, and the like.

Another such reference is German Patent DE 43 18 738 which discloses using a motor vehicle as a carrier for conventional filters and/or catalysts to physically and chemically clean outside air.

Another approach is disclosed in U.S. Pat. No. 5,147,429. There is disclosed a mobile airborne air cleaning station. In particular this patent features a dirigible for collecting air. The dirigible has a plurality of different types of air cleaning devices contained therein. The air cleaning devices disclosed include wet scrubbers, filtration machines, and cyclonic spray scrubbers.

The difficulty with devices disclosed to proactively clean the atmospheric air is that they require new and additional equipment. Even the modified vehicle disclosed in U.S. Pat. No. 3,738,088 requires ducting and filters which can include catalytic filters.

DE 40 07 965 C2 to Klaus Hager discloses a catalyst comprising copper oxides for converting ozone and a mixture of copper oxides and manganese oxides for converting carbon monoxide. The catalyst can be applied as a coating to a self heating radiator, oil coolers or charged-air coolers. The catalyst coating comprises heat resistant binders which are also gas permeable. It is indicated that the copper oxides and manganese oxides are widely used in gas mask filters and have the disadvantage of being poisoned by water vapor. However, the heating of the surfaces of the automobile during operation evaporates the water. In this way, continuous use of the catalyst is possible since no drying agent is necessary.

It would therefore be a significant advance in the art of removing pollutants from ambient air flowing through the engine compartment of a motor vehicle to provide a pollutant treating device that can be positioned within the normal flow patterns of the ambient air without the need to employ additional equipment for directing the ambient air flow.

SUMMARY OF THE INVENTION

The present invention is generally directed to an apparatus and method to treat the atmosphere. In particular, the present invention provides for the removal of atmospheric pollutants as they travel in normal flow patterns within the engine compartment of a motor vehicle. In accordance with the present invention the pollutants can be treated with a pollutant treating device that is convenient to use, relatively inexpensive and, in a preferred form of the invention, readily renewable. The pollutant treating device can remove pollutants from the atmosphere by catalytically promoting the conversion of the pollutants to harmless by-products and/or by adsorbing the pollutants.

More specifically the present invention is directed to a pollutant treating device positioned in the engine compartment of a motor vehicle which lies in at least one normal flow pattern of ambient air as it passes through the engine compartment. The pollutant treating device comprises at least one pollutant treating component in the form of a structure having a pollutant treating composition. The structure is positioned within a normal flow pattern of ambient air passing through the engine compartment and thereby is in flow communication with pollutants contained within the ambient air. The pollutant treating composition which may include a catalyst and/or an adsorbent converts and/or entraps the pollutants to thereby remove the same from the ambient air. The pollutant free ambient air is then returned to the atmosphere.

In accordance with an important aspect of the present invention the ambient air entering the engine compartment of the motor vehicle is allowed to flow through normal flow patterns within the engine compartment. In particular, there is no special equipment provided to the engine compartment for the purpose of directing the ambient air towards a particular location. Instead, the pollutant treating device of the present invention is positioned in at least one normal flow pattern of the ambient air so that its sole purpose is to enable effective contact between the pollutants and the pollutant treating composition.

In a preferred embodiment of the invention, the pollutant treating device is positioned in proximity to the radiator of the motor vehicle so as to be in flow communication with the ambient air passing into or out of the radiator. The pollutant treating device may also be positioned in proximity to the air conditioner condenser, air charge cooler and/or radiator fan since these engine compartment components are typically in at least one normal flow pattern of the ambient air.

In another preferred embodiment of the invention the pollutant treating device is provided with a support means, such as a bracket assembly which enables the pollutant treating component to be readily renewed (e.g. replaced or reused) when the pollutant treating device can no longer remove pollutants from the ambient air.

As used herein, the term "atmosphere" shall mean the mass of air surrounding the earth. The term "ambient air" shall mean the atmosphere which is normally flowing through a motor vehicle engine compartment or is drawn or forced towards the pollutant treating device. It is intended to include air which has been heated either incidentally or by a heating means. The device can contain a catalyst composition to convert pollutants into non-toxic materials and/or an adsorbent for adsorbing pollutants to provide at least a substantially pollutant-free gas. Also as used herein the term "catalyst composition" is intended to mean compositions containing catalytic materials, adsorbents or combinations thereof.

The term "normal flow pattern" shall mean the flow path of ambient air through an engine compartment containing only vehicle components which are required for the normal operation of the motor vehicle.

The term "renewable" shall mean that the pollutant treating device can be readily replaced or reused for the purpose of removing pollutants from the ambient air. The term "engine compartment" shall be used in its customary broad sense to include all components of a motor vehicle contained within the space defined by the grille, the rear fire wall and the side fender wells as well as the underchassis and hood. Examples of motor vehicle components contained within the engine compartment include an air conditioner condenser, a radiator, at least one fan, an engine, an air charge cooler also referred to as an intercooler or aftercooler, fluid containers (for brake fluids, transmission fluids, oils and the like) and the like. The engine compartment includes such components regardless of whether the engine compartment is located in the front, rear or mid-position of the motor vehicle.

The present invention is directed to compositions, methods and articles to treat pollutants in ambient air. Such pollutants may typically comprise from 0 to 400 parts, more typically 1 to 300 parts, and yet more typically 1 to 200 parts, per billion (ppb) ozone; 0 to 30 parts, and more typically 1 to 20 parts, per million (ppm) carbon monoxide; and 2 to 3000 ppb unsaturated hydrocarbon compounds such as $C_2$ to $C_{20}$ olefins and partially oxygenated hydrocarbons such as alcohols, aldehydes, esters, ethers, ketones and the like. Other pollutants present may include nitrogen oxides and sulfur oxides. The National Ambient Air Quality Standard for ozone is 120 ppb, and carbon monoxide is 9 ppm.

Pollutant treating compositions include catalyst compositions useful for catalyzing the conversion of pollutants present in the atmosphere to non-objectionable materials. Alternatively, adsorption compositions can be used as the pollutant treating composition to adsorb pollutants which can be destroyed upon adsorption, or stored for further treatment at a later time. Such compositions are disclosed in commonly assigned United States patent application entitled "Vehicle having Atmosphere Pollutant Treating Surface", attorney docket no. 3777C filed concurrently herewith and bearing U.S. Ser. No. 08/589,182, which is incorporated herein by reference.

Catalyst compositions can be used which can assist in the conversion of the pollutants to harmless compounds or to less harmful compounds. Useful and preferred catalyst compositions include compositions which catalyze the reaction of ozone to form oxygen, catalyze the reaction of carbon monoxide to form carbon dioxide, and/or catalyze the reaction of hydrocarbons to form water and carbon dioxide. Specific and preferred catalysts to catalyze the reaction of hydrocarbons are useful for catalyzing the reaction of low molecular weight unsaturated hydrocarbons having from two to twenty carbons and at least one double bond, such as $C_2$ to about $C_8$ mono-olefins. Such low molecular weight hydrocarbons have been identified as being sufficiently reactive to cause smog. Particular olefins which can be reacted include propylene and butylene. A useful and preferred catalyst can catalyze the reactions of both ozone and carbon monoxide; and preferably ozone, carbon monoxide and hydrocarbons.

Ozone—Useful and preferred catalyst compositions to treat ozone include a composition comprising manganese compounds including oxides such as $Mn_2O_3$ and $MnO_2$ with a preferred composition comprising $\alpha\text{-}MnO_2$, and cryptomelane being most preferred. Other useful and preferred compositions include a mixture of $MnO_2$ and $CuO$. Specific and preferred compositions comprise hopcalite which contains $CuO$ and $MnO_2$ and, more preferably Carulite® which contains $MnO_2$, $CuO$ and $Al_2O_3$ and sold by the Carus Chemical Co. An alternative composition comprises a refractory metal oxide support on which is dispersed a catalytically effective amount of a palladium component and preferably also includes a manganese component. Also useful is a catalyst comprising a precious metal component, preferably a platinum component on a support of coprecipitated zirconia and manganese oxide. The use of this coprecipitated support has been found to be particularly effective to enable a platinum component to be used to treat ozone. Yet another composition which can result in the conversion of ozone to oxygen comprises carbon, and palladium or platinum supported on carbon, manganese dioxide, Carulite® and/or hopcalite. Manganese supported on a refractory oxide such as alumina has also been found to be useful.

Carbon Monoxide—Useful and preferred catalyst compositions to treat carbon monoxide include a composition comprising a refractory metal oxide support on which is dispersed a catalytically effective amount of a platinum or palladium component, preferably a platinum component. A most preferred catalyst composition to treat carbon monoxide comprises a reduced platinum group component supported on a refractory metal oxide, preferably titania. Useful catalytic materials include precious metal components including platinum group components which include the metals and their compounds. Such metals can be selected from platinum, palladium, rhodium and ruthenium, gold and/or silver components. Platinum will also result in the catalytic reaction of ozone. Also useful is a catalyst comprising a precious metal component, preferably a platinum component on a support of coprecipitated zirconia and manganese dioxide. Preferably, this catalyst embodiment is reduced. Other useful compositions which can convert carbon monoxide to carbon dioxide include a platinum component supported on carbon or a support comprising manganese dioxide. Preferred catalysts to treat such pollutants are reduced. Another composition useful to treat carbon monoxide comprises a platinum group metal component, preferably a platinum component, a refractory oxide support, preferably alumina and titania and at least one metal component selected from a tungsten component and rhenium component, preferably in the metal oxide form.

Hydrocarbons—Useful and preferred catalyst compositions to treat unsaturated hydrocarbons including $C_2$ to about $C_{20}$ olefins and typically $C_2$ to $C_8$ mono-olefins such as propylene and partially oxygenated hydrocarbons as recited have been found to be the same type as recited for use in catalyzing the reaction of carbon monoxide with the preferred compositions for unsaturated hydrocarbons comprising a reduced platinum component and a refractory metal oxide support for the platinum component. A preferred refractory metal oxide support is titania. Other useful compositions which can convert hydrocarbons to carbon dioxide and water include a platinum component supported on carbon or a support comprising manganese dioxide. Preferred catalysts to treat such pollutants are reduced. Another composition useful to convert hydrocarbons comprises a platinum group metal component, preferably a platinum component, a refractory oxide support, preferably alumina and titania and at least one metal component selected from a tungsten component and rhenium component, preferably in the metal oxide form.

Ozone and Carbon Monoxide—A useful and preferred catalyst which can treat both ozone and carbon monoxide comprises a support such as a refractory metal oxide support on which is dispersed a precious metal component. The refractory oxide support can comprise a support component selected from the group consisting of ceria, alumina, silica, titania, zirconia, and mixtures thereof. Also useful as a support for precious metal catalyst components is a coprecipitate of zirconia and manganese oxides. Most preferably, this support is used with a platinum component and the catalyst is in reduced form. This single catalyst has been found to effectively treat both ozone and carbon monoxide. Other useful and preferred precious metal components are comprised of precious metal components selected from palladium and also platinum components with palladium preferred. A combination of a ceria support with a palladium component results in an effective catalyst for treating both ozone and carbon monoxide. Other useful and preferred catalysts to treat both ozone and carbon monoxide include a platinum group component, preferably a platinum component or palladium component and more preferably a platinum component, on titania or on a combination of zirconia and silica. Other useful compositions which can convert ozone to oxygen and carbon monoxide to carbon dioxide include a platinum component supported on carbon or on a support comprising manganese dioxide. Preferred catalysts are reduced.

Ozone, Carbon Monoxide and Hydrocarbons—A useful and preferred catalyst which can treat ozone, carbon monoxide and hydrocarbons, typically low molecular weight olefins ($C_2$ to about $C_{20}$) and typically $C_2$ to $C_8$ mono-olefins and partially oxygenated hydrocarbons as recited comprises a support, preferably a refractory metal oxide support on which is dispersed a precious metal component. The refractory metal oxide support can comprise a support component selected from the group consisting of ceria, alumina, titania, zirconia and mixtures thereof with titania most preferred. Useful and preferred precious metal components are comprised of precious metal components selected from platinum group components including palladium and platinum components with platinum most preferred. It has been found that a combination of a titania support with a platinum component results in the most effective catalyst for treating ozone, carbon monoxide and low molecular weight gaseous olefin compounds. It is preferred to reduce the platinum group components with a suitable reducing agent. Other useful compositions which can convert ozone to oxygen, carbon monoxide to carbon dioxide, and hydrocarbons to carbon dioxide include a platinum component supported on carbon, a support comprising manganese dioxide, or a support comprising a coprecipitate of manganese oxides and zirconia. Preferred catalysts are reduced.

The above compositions can be applied by coating to the pollutant treating device. Particularly preferred compositions catalyze the destruction of ozone, carbon monoxide and/or unsaturated low molecular weight olefinic compounds at ambient conditions or ambient operating conditions. Ambient conditions are the conditions of the atmosphere. Ambient operating conditions shall mean the conditions, such as temperature, of the pollutant treating device during normal operation of the vehicle without the use of additional energy directed to heating the pollutant treating device. It has been found that preferred catalysts which catalyze the reaction of ozone can catalyze the reaction of ozone at ambient conditions in ranges as low as 5 to 30° C.

Various of the catalyst compositions can be combined, and a combined coating applied to the pollutant treating device. Alternatively, different surfaces or different parts of the same surface of the device can be coated with different catalyst compositions.

The method and apparatus of the present invention are designed so that the pollutants can be treated at ambient atmospheric conditions. The present invention is particularly useful for treating ozone with suitable catalysts useful to destroy such pollutants even at ambient conditions, and at vehicle surface temperatures typically from at least 0° C., preferably from 10 to 105° C., and more preferably from 40 to 100° C. Carbon monoxide is preferably treated at atmosphere contacting surface temperatures from 40 to 105° C. Low molecular weight hydrocarbons, typically unsaturated hydrocarbons having at least one unsaturated bond, such as $C_2$ to $C_{20}$ olefins, and typically $C_2$ to $C_8$ mono-olefins are preferably treated at temperatures of from 40 to 105° C. The percent conversion of ozone, carbon monoxide and/or hydrocarbons depends on the temperature and space velocity of the atmospheric air relative to the pollutant treating device.

Accordingly, the present invention, in most preferred embodiments can result in at least reducing the ozone, carbon monoxide and/or hydrocarbon levels present in the atmosphere without the addition of any mechanical features or energy source to existing vehicles, particularly motor vehicles. Additionally, the catalytic reaction takes place at the normal ambient operating conditions so that no changes in the construction or method of operation of the motor vehicle are required.

While the apparatus and method of the present invention are generally directed to treating the atmosphere, it will be appreciated that variations of the apparatus are contemplated for use to treat volumes of air in enclosed spaces. For example, a motor vehicle having a pollutant treating device can be used to treat the air within factories, mines and tunnels. Such apparatus can include vehicles used in such environments.

While the preferred embodiments of the present invention are directed to the destruction of pollutants at the ambient operating temperatures of the atmosphere contacting surface, it is also desirable to treat pollutants which have a catalyzed reaction temperature higher than the ambient temperature or ambient operating temperature of the atmosphere contacting surface. Such pollutants include hydrocarbons and nitrogen oxides and to some extent carbon monoxide. These pollutants can be treated at higher temperatures typically in the range of at least 100 to 450° C. This can be accomplished, for example, by the use of an auxiliary heated catalyzed surface. By an auxiliary heated surface, it is meant that there are supplemental means to heat the surface. A preferred auxiliary heated surface is the surface of an electrically heated catalyzed monolith such as an electrically heated catalyzed metal honeycomb of the type known to those skilled in the art. Electricity can be provided by batteries or a generator such as are present in motor vehicles. The catalyst composition can be any well known oxidation and/or reduction catalyst, preferably a three way catalyst (TWC) comprising precious group metals such as platinum, palladium, rhodium and the like supported on refractory oxide supports. An auxiliary heated catalyzed surface can be used in combination with, and preferably downstream of, the pollutant treating device to further treat the pollutants.

As previously stated, adsorption compositions can also be used to adsorb pollutants such as hydrocarbons and/or particulate matter for later oxidation or subsequent removal. Useful and preferred adsorption compositions include zeolites, other molecular sieves, carbon, and Group IIA alkaline earth metal oxides such as calcium oxide. Hydrocarbons and particulate matter can be adsorbed from 0° C. to 110° C. and subsequently treated by desorption followed by catalytic reaction or incineration.

The renewable device of the present invention can be readily installed, and replaced and/or reused in a motor vehicle, air conditioning unit or other device in which a gas flow (e.g. air flow) is present. The renewable device may generally be placed anywhere in a normal flow pattern of the ambient air passing through the engine compartment of the motor vehicle. It is preferred that the device be placed in proximity to a source of heat (e.g. radiator) so that the temperature of the ambient air may be elevated prior to contacting the device, or that heat be provided by some other means.

The ambient air is drawn into contact with the pollutant treating device by natural wind currents or preferably by the use of an air drawing means such as a fan or the like. By way of example, the fan may be positioned in a tunnel, or as part of an air conditioning system or a fan, preferably in motor vehicles a standard fan, used in a conventional cooling system of a motor vehicle. The fan is typically operated by a power source such as a battery, preferably the conventional 12 volt battery used in a motor vehicle, solar panel and the like.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 10 is an XRD pattern for cryptomelane shown as counts using a square root scale versus the Bragg angle, $2\theta$.

DETAILED DESCRIPTION OF THE INVENTION

The present invention is generally directed to a pollutant treating device for treating pollutants in ambient air as the ambient air travels in normal flow patterns within the engine compartment of a motor vehicle.

The present invention will be understood by those skilled in the art by reference to the accompanying drawings represented by FIGS. 1–8. The pollutant treating device of the present invention can be used in conjunction with any motor vehicle having means to convey the vehicle through the atmosphere. As the vehicle moves through the atmosphere, the pollutant treating device comprising a pollutant treating composition (e.g., a catalyst or an adsorber) located thereon encounters various pollutants including particulate matter and/or gaseous pollutants carried in the ambient air. The pollutants are catalytically reacted or adsorbed by the pollutant treating composition to produce a relatively pollutant free ambient air stream which is returned to the atmosphere.

It will be appreciated by those skilled in the art that the vehicle can be any suitable vehicle which has a translation means to propel the vehicle such as wheels, sails, belts, tracks or the like. Such means can be powered by any suitable power means including engines which use fossil fuel power such as gasoline or diesel fuel, ethanol, methanol, gas engines powered by fuels such as methane gas, wind power such as by wind driving sails or propellers, solar power or electric power such as in battery operated automobiles. Vehicles include cars, trucks, buses, trains, boats, ships, airplanes, dirigibles, balloons and the like. By way of example, and for illustrative purposes only, a truck as illustrated in FIG. 1 will be used to describe the invention in greater detail.

Figure 1:
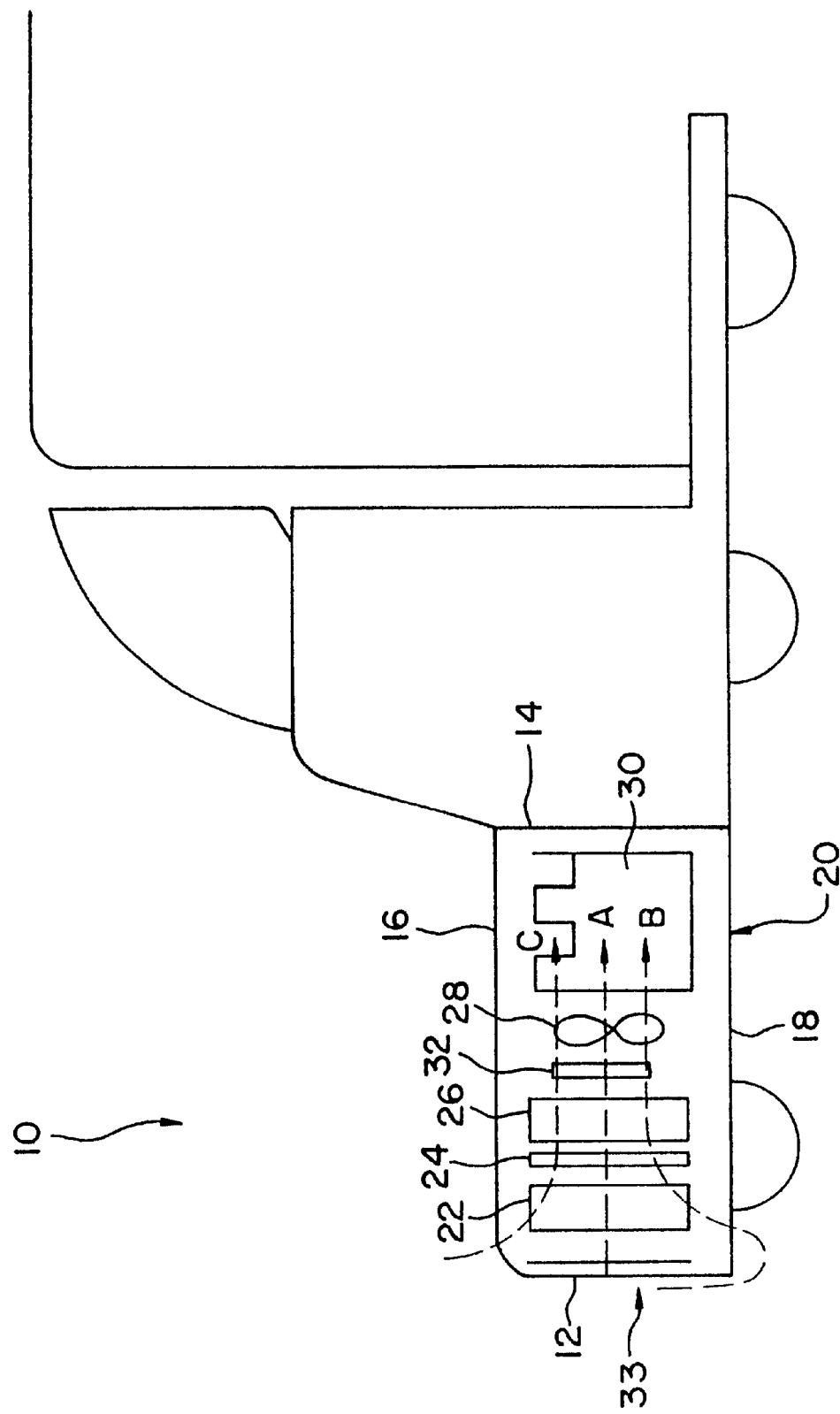
FIG. 1 is a schematic cross-sectional side view of the engine compartment of a truck with a pollutant treating device of the present invention positioned to the rear of the radiator.

Referring to FIG. 1, there is shown a truck 10 having a variety of vehicle components contained with an engine compartment identified by the numeral 20. The engine compartment 20 is bounded by a grille 12 in the front, a firewall 14 to the rear, a hood 16 to the top and an underchassis 18 to the bottom. The engine compartment is also bounded by side fender wells (not shown). The vehicle components contained within the engine compartment 20 include, but are not limited to an air conditioner condenser 22, an air charge cooler 24, a radiator 26, a radiator associated fan 28 and an engine 30. It will be understood that other vehicle components may be present in the engine compartment but have not been illustrated for the sake of simplicity. It will be further understood that the location of the engine compartment 20 and the respective vehicle components therein may be located in the front, rear or mid position of the motor vehicle.

When the motor vehicle is in motion, ambient air can enter the engine compartment 20 through the grille 12 or through the underchassis 18. Some ambient air may also enter through the intersection of the side fender walls (not shown) and the hood 16. In each case the ambient air has a normal pattern of flow through the engine compartment. Referring to FIG. 1, Arrow A shows an example of a normal flow pattern of ambient air entering through the grille 12. Arrow B shows an example of a normal flow pattern of ambient air entering through the underchassis 18. Arrow C shows an example of a normal flow pattern of ambient air entering the engine compartment 20 through the intersection of the side fender wells and the hood.

In accordance with the present invention, the pollutant treating device is positioned within at least one normal flow pattern of ambient air through the engine compartment. The pollutant treating device is a structure which includes a catalyst composition containing a catalytic material and/or an adsorbent which frees the ambient air from pollutants. Referring again to FIG. 1, the pollutant treating device shown by numeral 32 is positioned within the normal flow patterns of the ambient air as represented by Arrows A–C. It will be understood that the pollutant treating device 32 may be positioned anywhere within the engine compartment 20 so long as it is within a normal flow pattern of ambient air from any entryway (e.g. represented by Arrow A or B or C) or multiple entryways (e.g. represented by Arrows A–C).

As shown specifically in FIG. 1 and as preferred in the present invention, the pollutant treating device 32 is positioned on the rear side of the radiator 26, thereby taking advantage of the heat provided to the ambient air as it passes through the radiator. The pollutant treating device 32 may also be positioned in front of the radiator 26, behind or in front of the air charge cooler 24, behind or in front of the radiator fan 28, as well as elsewhere.

In a preferred form of the invention, the pollutant treating device is supported within the engine compartment by a support means which enables the pollutant treating device to be renewable, that is readily replaced or reused.

Figure 2:
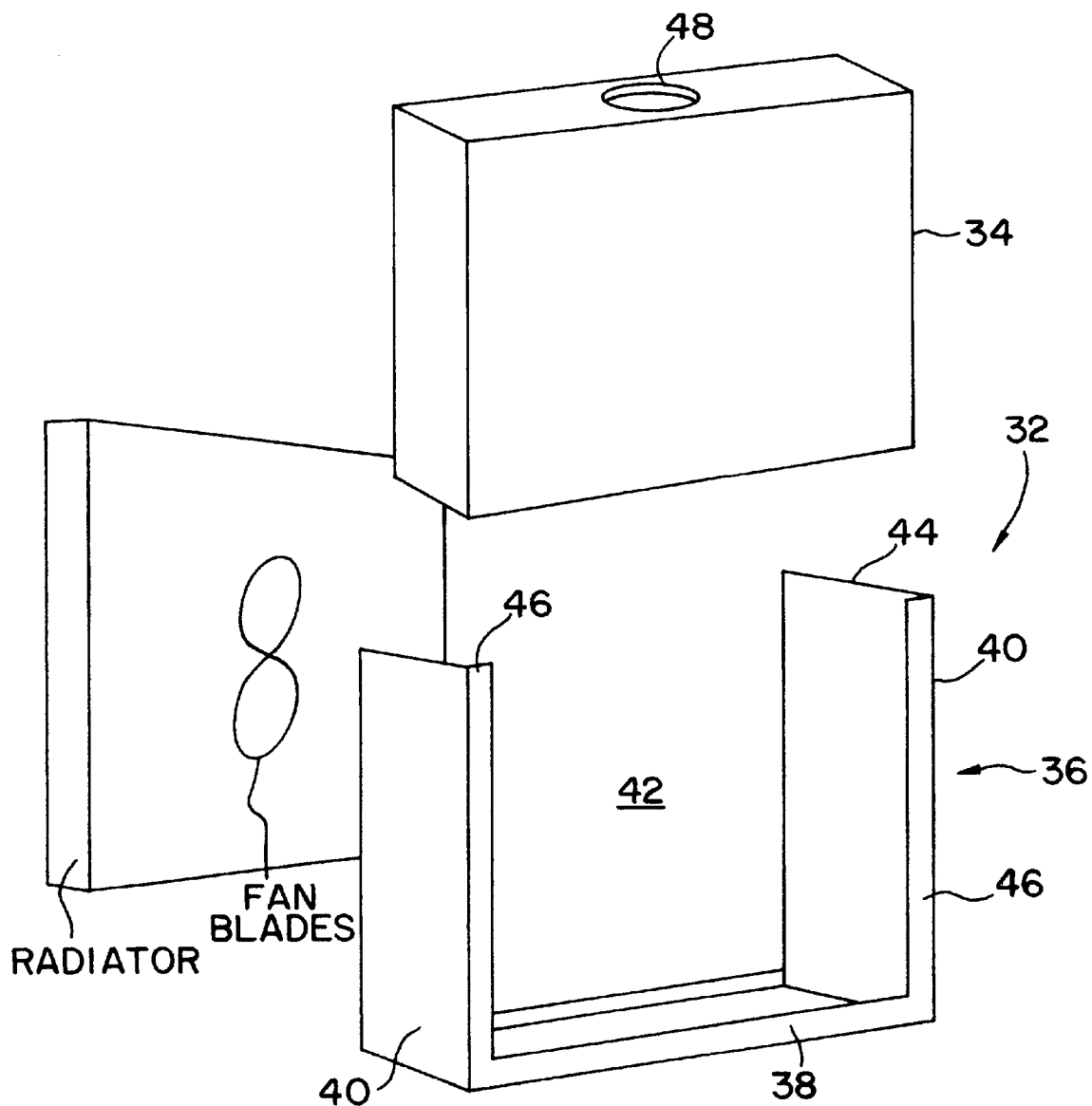
FIG. 2 is a perspective view of a preferred embodiment of a single pollutant treating device of the present invention.

Referring to FIG. 2, the pollutant treating device is shown positioned under the hood of an automobile behind the radiator supported by a support means in the form of a bracket assembly. The support means enables the pollutant treating device to be readily removed and replaced or reused as will be explained in detail hereinafter.

The pollutant treating device 32 includes a housing 34 having therein a substrate coated with a catalyst composition. The housing 34 fits in a bracket assembly 36 having a base 38 and opposed walls 40 defining an area 42 for receipt of the housing 34. It will be noted that the bracket assembly 36 has an open top section 44 that enables the housing 34 containing the catalyst composition to be readily inserted into the area 42 and then removed when a replacement device or cleaning is required. The bracket assembly 36 preferably includes flanges 46 to ensure that the housing 34 remains within the bracket and to prevent undesirable movement thereof, such as movement caused when the motor vehicle is in motion.

As shown in the embodiment of FIG. 2 a single housing 34 is inserted into the bracket assembly 36. The housing 34 may be held on the sides or a handle 48 may be provided at the top to facilitate loading and removal. When the catalyst composition is spent or can no longer perform its intended function, the spent housing is removed by lifting the handle 48 or grabbing the sides of the housing and replaced with a housing containing fresh catalyst composition. Alternatively, the spent housing can be removed and washed to clean off contaminants, debris and the like such as oil, salt and the like to thereby regenerate the catalyst composition so that it may be reused. The preferred washing liquid is water although commercial cleaning solutions can be used so long as they do not adversely affect the catalytic or adsorption properties of the catalytic composition. The cleaned housing can then be reinserted into the bracket assembly 36 and reused to remove pollutants from the air.

During normal operation, the vehicle moves in a forward direction with the front 33 of the vehicle 10 initially contacting the atmospheric air. Typically, vehicles move through the air at velocities of up to about 1,000 miles per hour for jet planes. Land vehicles and water vehicles typically move at velocities of up to 300 miles per hour, more typically up to 200 miles per hour with motor vehicles moving at velocities up to 100 miles per hour and typically from 5 to 75 miles per hour. Seagoing vehicles, such as boats, typically move through the water at velocities up to 30 miles per hour and typically from 2 to 20 miles per hour. In accordance with the method of the present invention the relative velocity (or face velocity) between the pollutant treating device and the ambient air, as the vehicle, typically an automobile or land based vehicle, moves through the atmosphere, is from 0 to 100 miles per hour, and typically from 2 to 75 miles per hour in an automobile typically from 5 to 60 miles per hour. The face velocity is the velocity of the air relative to the pollutant treating device.

In motor vehicles such as trucks 10 which have a radiator fan 28, the fan draws atmospheric air through the grille 12 into the engine compartment 20 and specifically as shown in FIG. 1, the air conditioner condenser 22, air charge cooler 24 and/or radiator 26 in addition to air which passes across these elements as the motor vehicle moves through the atmosphere. When the motor vehicle is idling the relative face velocity of air drawn into the radiator 26 typically ranges from about 5 to 15 mph. The radiator fan 28 moderates the flow rate of air through the radiator 26 as the motor vehicle moves through the atmosphere. When a typical car is moving through the atmosphere at speeds approaching 70 mph, the inlet face velocity of air is at about 25 mph. Depending on the design of a motor vehicle using a radiator fan, cars have a face velocity as low as when the fan is used during idle up to about 100% of the face velocity corresponding to the velocity of the motor vehicle. However, typically, the face velocity of the air relative to the pollutant treating device is equal to the idle face velocity plus from 0.1 to 1.0 and more typically 0.2 to 0.8 times the velocity of the vehicle.

In accordance with the present invention, large volumes of air can be treated at relatively low temperatures. This occurs as vehicles move through the atmosphere. High surface area components of vehicles including radiators, air conditioner condensers and charge air coolers typically have a large frontal surface area which encounters the air stream. However, these devices are relatively narrow, typically ranging from about ¾ of an inch deep up to about 2 inches deep and usually in the range of ¾ to 1½ inches deep. The linear velocity of the atmospheric air contacting the frontal surface of such devices is typically in the range of up to 20, and more typically 5 to 15 miles per hour. An indication of the amount of air being treated as it passes across the catalyzed vehicle component is commonly referred to space velocity or more precisely volume hourly space velocity (VHSV). This is measured as volume (corresponding to the volume of the catalyzed element) of air per hour which passes across the volume of the catalytic article. It is based on the cubic feet per hour of air divided by the cubic feet of catalyst substrate. The volume of the catalyst substrate is the frontal area times the depth or axial length in the direction of the air flow. Alternatively, volume hourly space velocity is the number of catalyst volumes based on the volume of the catalytic article being treated per hour. Because of the relatively short axial depth of the catalyzed elements of the present invention, the space velocities are relatively high. The volume hourly space velocities of air which can be treated in accordance with the present invention can be a million or more reciprocal hours. A face velocity of air against one of these elements at 5 miles per hour can result in a space velocity of as high as 300,000 reciprocal hours. In accordance with the present invention, the catalysts are designed to treat pollutants in the atmosphere at space velocities in ranges as high as from 250,000 to 750,000 and typically 300,000 to 600,000 reciprocal hours. This is accomplished even at the relatively low ambient temperatures and ambient operating temperatures of the vehicle elements containing pollutant treating compositions in accordance with the present invention.

The housing 34 contains a substrate and a catalyst composition associated therewith, as for example coated on the substrate. The pollutant treating composition is preferably a catalytic composition or adsorption composition. Useful and preferred catalyst compositions are compositions which can catalytically cause the reaction of targeted pollutants at the space velocity of the air as it contacts the surface and at the temperature at the point of contact. Typically, these catalyzed reactions will be in the temperature range at the atmosphere contacting surface of the pollutant treating device of from about 0° C. to 130° C., more typically from about 20 to 105° C. and yet more typically from about 40 to 100° C. There is no limit on the efficiency of the reaction as long as some reaction takes place. Preferably, there is at least a 1% conversion efficiency with as high a conversion efficiency as possible. Useful conversion efficiencies are preferably at least about 5% and more preferably at least about 10%. Preferred conversions depend on the particular pollutant and pollutant treating composition. Where ozone is treated with a catalytic composition it is preferred that the conversion efficiency be greater than from about 30% to 40%, preferably greater than about 50%, and more preferably greater than about 70%. Preferred conversion efficiency for carbon monoxide is greater than about 30% and preferably greater than about 50%. Preferred conversion efficiency for hydrocarbons and partially oxygenated hydrocarbons is at least about 10%, preferably at least about 15%, and most preferably at least about 25%. These conversion rates are particularly preferred where the pollutant treating device is at ambient operating conditions of up to about 110° C. These temperatures are the surface temperatures typically experienced during normal operation of the vehicle. Where there is supplemental heating of the pollutant treating device as discussed in detail hereinafter such as by having an electrically heated catalytic monolith, grid, screen, gauze or the like, it is preferred that the conversion efficiency be greater than about 90% and more preferably greater than about 95%. The conversion efficiency is based on the mole percent of the particular pollutants in the air which react in the presence of the catalyst composition.

Ozone treating catalyst compositions comprise manganese compounds including manganese dioxide, including non stoichiometric manganese dioxide (e.g., $MnO_{(1.5-2.0)}$), and/or $Mn_2O_3$. Preferred manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

Useful and preferred manganese dioxides are alpha manganese dioxides nominally having a molar ratio of manganese to oxygen of from 1 to 2. Useful alpha manganese dioxides are disclosed in U.S. Pat. No. 5,340,562 to O'Young, et al.; also in O'Young, Hydrothermal Synthesis of Manganese Oxides with Tunnel Structures presented at the Symposium on Advances in Zeolites and Pillared Clay Structures presented before the Division of Petroleum Chemistry, Inc. American Chemical Society New York City Meeting, Aug. 25–30, 1991 beginning at page 342, and in McKenzie, the Synthesis of Birnessite, Cryptomelane, and Some Other Oxides and Hydroxides of Manganese, Mineralogical Magazine, December 1971, Vol. 38, pp. 493–502, all herein incorporated by reference. For the purposes of the present invention, the preferred alpha manganese dioxide is a 2×2 tunnel structure which can be hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$).

The manganese dioxides useful in the present invention preferably have a surface area of greater than 150 $m^2/g$, more preferably greater than 200 $m^2/g$, yet more preferably greater than 250 $m^2/g$ and most preferably greater than 275 $m^2/g$. The upper range of such materials can be as high as 300 $m^2/g$, 325 $m^2/g$ or even 350 $m^2/g$. Preferred materials are in the range of 200–350 $m^2/g$, preferably 250–325 $m^2/g$ and most preferably 275–300 $m^2/g$. The composition preferably comprises a binder as of the type described below with preferred binders being polymeric binders. The composition can further comprise precious metal components with preferred precious metal components being the oxides of precious metal, preferably the oxides of platinum group metals and most preferably the oxides of palladium or platinum also referred to as palladium black or platinum black. The amount of palladium or platinum black can range from 0 to 25%, with useful amounts being in ranges of from about 1 to 25 and 5 to 15% by weight based on the weight of the manganese component and the precious component.

It has been found that the use of compositions comprising the cryptomelane form of alpha manganese oxide, which also contain a polymeric binder can result in greater than 50%, preferably greater than 60% and most preferably from 75–85% conversion of ozone in a concentration range of from 0 to 400 parts per billion (ppb) and an air stream moving across a radiator at space velocity of from 300,000 to 650,000 reciprocal hours. Where a portion of the cryptomelane is replaced by up to 25% and preferably from 15–25% parts by weight of palladium black (PdO), ozone conversion rates at the above conditions range from 95–100% using a powder reactor.

The preferred cryptomelane manganese dioxide has a crystallite size ranging from 2 to 10 and preferably less than 5 nm. It can be calcined at a temperature range of from 250° C. to 550° C. and preferably below 500° C. and greater than 300° C. for at least 1.5 hours and preferably at least 2 hours up to about 6 hours.

The preferred cryptomelane can be made in accordance described in the above referenced articles and patents to O'Young and McKenzie. The cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha manganese useful in the present invention can contain one or more of hollandite, cryptomelane, manjiroite or coronadite compounds. Even when making cryptomelane minor amounts of other metal ions such as sodium may be present. Useful methods to form the alpha manganese dioxide are described in the above references which are incorporated by reference.

The preferred alpha manganese for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate. It has been found that the use of such a material which has been calcined is "clean". The use of material containing inorganic anions can result in conversion of ozone to oxygen of up to about 60%. The use of cryptomelane with a "clean" surface results in conversions of up about 80%.

It is believed that the carboxylates are burned off during the calcination process. However, inorganic anions remain on the surface even during calcination. The inorganic anions such as sulfates can be washed away with an aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The "clean" alpha manganese dioxide is characterized as having an IR spectrum as illustrated in FIG. 19 and in X-ray diffraction (XRD) pattern as illustrated in FIG. 20. Such a cryptomelane preferably has a surface area greater than 200 $m^2/g$ and more preferably greater than 250 $m^2/g$. A review of the IR spectrum for the most preferred cryptomelane, shown in FIG. 19 is characterized by the absence of peaks assignable to carbonate, sulfate and nitrate groups. Expected peaks for carbonate groups appear in the range of from 1320 to 1520 wavenumbers; and for sulfate groups appear in the range of from 950 to 1250 wavenumbers. FIG. 20 is a powder X-ray diffraction pattern for high surface area cryptomelane prepared in Example 23. The X-ray pattern for cryptomelane useful in the present invention is characterized by broad peaks resulting from small crystallite size (~5–10 nm). Approximate peak positions (±0.15°2θ) and approximate relative intensities (±5) for cryptomelane using $CuK_\alpha$ radiation as shown in FIG. 20 are: 2θ/Relative Intensities −12.1/9; 18/9; 28.3/10; 37.5/100; 41.8/32; 49.7/16; 53.8/5; 60.1/13; 55.7/38; and 68.0/23.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 200 $m^2/g$ to 350 $m^2/g$.

Other useful compositions comprise manganese dioxide and optionally copper oxide and alumina and at least one precious metal component such as a platinum group metal supported on the manganese dioxide and where present copper oxide and alumina. Useful compositions contain up to 100, from 40 to 80 and preferably 50 to 70 weight percent manganese dioxide and 10 to 60 and typically 30 to 50 percent copper oxide. Useful compositions include hopcalite which is about 60 percent manganese dioxide and about 40 percent copper oxide; and Carulite® 200 (sold by Carus Chemical Co.) which is reported to have 60 to 75 weight percent manganese dioxide, 11 to 14 percent copper oxide and 15 to 16 percent aluminum oxide. The surface area of Carulite® is reported to be about 180 $m^2/g$. Calcining at 450° C. reduces the surface area of the Carulite® by about fifty percent (50%) without significantly affecting activity. It is preferred to calcine manganese compounds at from 300° C. to 500° C. and more preferably 350° C. to 450° C. Calcining at 550° C. causes a great loss of surface area and ozone treatment activity. Calcining the Carulite® after ball milling with acetic acid and coating on a substrate can improve adhesion of the coating to a substrate.

Other compositions to treat ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from 0.1 to 5 weight percent, with useful and preferred amounts on pollutant treating catalyst volume, based on the volume of the supporting article, ranging from about 0.5 to about 70 $g/ft^3$. The amount of palladium component preferably ranges from about 2 to about 10 weight percent of the composition, with useful and preferred amounts on pollutant treating catalyst volume ranging from about 10 to about 250 $g/ft^3$.

Various useful and preferred pollutant treating catalyst compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica-zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 μm or in sol form also having a particle size ranging from about 1 to about 50 and preferably about 1 to about 10 nm. A preferred titania sol support comprises titania having a particle size ranging from about 1 to about 10, and typically from about 2 to 5 nm.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450°–500° C.

A useful support for a catalyst to treat ozone is selected from a refractory oxide support, preferably alumina and silica-alumina with a more preferred support being a silica-alumina support comprising from about 1% to 10% by weight of silica and from 90% to 99% by weight of alumina.

Useful refractory oxide supports for a catalyst comprising a platinum group metal to treat carbon monoxide are selected from alumina, titania, silica-zirconia, and manganese-zirconia. Preferred supports for a catalyst composition to treat carbon monoxide is a zirconia-silica support as recited in U.S. Pat. No. 5,145,825, a manganese-zirconia support as recited in U.S. Pat. No. 5,283,041 and high surface area alumina. Most preferred for treatment of carbon monoxide is titania. Reduced catalysts having titania supports resulted in greater carbon monoxide conversion than corresponding non reduced catalysts.

The support for catalyst to treat hydrocarbons, such as low molecular weight hydrocarbons, particularly low molecular weight olefinic hydrocarbons having about from two up to about twenty carbons and typically two to about eight carbon atoms, as well as partially oxygenated hydrocarbons is preferably selected from refractory metal oxides including alumina and titania. As with catalysts to treat carbon monoxide reduced catalysts results in greater hydrocarbon conversion. Particularly preferred is a titania support which has been found useful since it results in a catalyst composition having enhanced ozone conversion as well as significant conversion of carbon monoxide and low molecular weight olefins. Also useful are high surface area, macroporous refractory oxides, preferably alumina and titania having a surface area of greater than 150 m$^2$/g and preferably ranging from about 150 to 350, preferably from 200 to 300, and more preferably from 225 to 275 m$^2$/g; a porosity of greater than 0.5 cc/g, typically ranging from 0.5 to 4.0 and preferably about from 1 to 2 cc/g measured based on mercury porosometry; and particle sizes range from 0.1 to 10 μm. A useful material is Versal GL alumina having a surface area of about 260 m$^2$/g, a porosity of 1.4 to 1.5 cc/g and supplied by LaRoche Industries.

A preferred refractory support for platinum for use in treating carbon monoxide and/or hydrocarbons is titania dioxide. The titania can be used in bulk powder form or in the form of titania dioxide sol. The catalyst composition can be prepared by adding a platinum group metal in a liquid media preferably in the form of a solution such as platinum nitrate with the titania sol, with the sol most preferred. The obtained slurry can then be coated onto a suitable substrate such as an atmosphere treating surface such as a radiator, metal monolith substrate or ceramic substrate. The preferred platinum group metal is a platinum compound. The platinum titania sol catalyst obtained from the above procedure has high activity for carbon monoxide and/or hydrocarbon oxidation at ambient operating temperature. Metal components other than platinum components which can be combined with the titania sol include gold, palladium, rhodium and silver components. A reduced platinum group component, preferably a platinum component on titanium catalyst which is indicated to be preferred for treating carbon monoxide, has also been found to be useful and preferred for treating hydrocarbons, particularly olefinic hydrocarbons.

A preferred titania sol support comprises titania having a particle size ranging from about 1 to about 10, and typically from about 2 to 5 nm.

A preferred bulk titania has a surface area of about from 25 to 120 m$^2$/g, and preferably from 50 to 100 m$^2$/g; and a particle size of about from 0.1 to 10 μm. A specific and preferred bulk titania support has a surface area of 45–50 m$^2$/g, a particle size of about 1 μm, and is sold by DeGussa as P-25.

A preferred silica-zirconia support comprises from 1 to 10 percent silica and 90 to 99 percent zirconia. Preferred support particles have high surface area, e.g. from 100 to 500 square meters per gram (m$^2$/g) surface area, preferably from 150 to 450 m$^2$/g, more preferably from 200 to 400 m$^2$/g, to enhance dispersion of the catalytic metal component or components thereon. The preferred refractory metal oxide support also has a high porosity with pores of up to about 145 nm radius, e.g., from about 0.75 to 1.5 cubic centimeters per gram (cm$^3$/g), preferably from about 0.9 to 1.2 cm$^3$/g, and a pore size range of at least about 50% of the porosity being provided by pores of 5 to 100 nm in radius.

A useful ozone treating catalyst comprises at least one precious metal component, preferably a palladium component dispersed on a suitable support such as a refractory oxide support. The composition comprises from 0.1 to 20.0 weight percent, and preferably 0.5 to 15 weight percent of precious metal on the support, such as a refractory oxide support, based on the weight of the precious metal (metal and not oxide) and the support. Palladium is preferably used in amounts of from 2 to 15, more preferably 5 to 15 and yet more preferably 8 to 12 weight percent. Platinum is preferably used at 0.1 to 10, more preferably 0.1 to 5.0, and yet more preferably 2 to 5 weight percent. Palladium is most preferred to catalyze the reaction of ozone to form oxygen. The support materials can be selected from the group recited above. In preferred embodiments, there can additionally be a bulk manganese component as recited above, or a manganese component dispersed on the same or different refractory oxide support as the precious metal, preferably palladium component. There can be up to 80, preferably up to 50, more preferably from 1 to 40 and yet more preferably 5 to 35 weight percent of a manganese component based on the weight of palladium and manganese metal in the pollutant treating composition. Stated another way, there is preferably about 2 to 30 and preferably 2 to 10 weight percent of a manganese component. The catalyst loading is from 20 to 250 grams and preferably about 50 to 250 grams of palladium per cubic foot (g/ft$^3$) of catalyst volume. The catalyst volume is the total volume of the finished catalyst composition and therefore includes the total volume of air conditioner condenser or radiator including void spaces provided by the gas flow passages. Generally, the higher loading of palladium results in a greater ozone conversion, i.e., a greater percentage of ozone decomposition in the treated air stream.

Conversions of ozone to oxygen attained with a palladium/manganese catalyst on alumina support compositions at a temperature of about 40° C. to 50° C. have been about 50 mole percent where the ozone concentrations range from 0.1 to 0.4 ppm and the face velocity was about 10 miles per hour. Lower conversions were attained using a platinum on alumina catalyst.

Of particular interest is the use of a support comprising the above described coprecipitated product of a manganese oxide, and zirconia which is used to support a precious metal, preferably selected from platinum and palladium, and most preferably platinum. Platinum is of particular interest in that it has been found that platinum is particularly effective when used on this coprecipitated support. The amount of platinum can range from 0.1 to 6, preferably 0.5 to 4, more preferably 1 to 4, and most preferably 2 to 4 weight percent based on metallic platinum and the coprecipitated support. The use of platinum to treat ozone has been found to be particularly effective on this support. Additionally, as discussed below, this catalyst is useful to treat carbon monoxide. Preferably the precious metal is platinum and the catalyst is reduced.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Ser. No. 08/202,397 filed Feb. 25, 1994, now U.S. Pat. No. 5,422,331 and entitled, "Light Weight, Low Pressure Drop Ozone Decomposition Catalyst for Aircraft Applications" hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

Carbon monoxide treating catalysts preferably comprise at least one precious metal component, preferably selected from platinum and palladium components with platinum components being most preferred. The composition comprises from 0.01 to 20 weight percent, and preferably 0.5 to 15 weight percent of the precious metal component on a suitable support such as refractory oxide support, with the amount of precious metal being based on the weight of precious metal (metal and not the metal component) and the support. Platinum is most preferred and is preferably used in amounts of from 0.01 to 10 weight percent and more preferably 0.1 to 5 weight percent, and most preferably 1.0 to 5.0 weight percent. Palladium is useful in amounts from 2 to 15, preferably 5 to 15 and yet more preferably 8 to 12 weight percent. The preferred support is titania, with titania sol most preferred as recited above. When loaded onto a monolithic structure such as a radiator or onto other atmosphere contacting surfaces the catalyst loading is preferably about 1 to 150, and more preferably 10 to 100 grams of platinum per cubic foot (g/ft$^3$) of catalyst volume and/or 20 to 250 and preferably 50 to 250 grams of palladium per g/ft$^3$ of catalyst volume. Preferred catalysts are reduced.

An alternate and preferred catalyst composition to treat carbon monoxide comprises a precious metal component supported on the above described coprecipitate of a manganese oxide and zirconia. The coprecipitate is formed as described above. The preferred ratios of manganese to zirconia are from about 5:95 to 95:5; from about 10:90 to 75:25; from about 10:90 to 50:50; and from about 15:85 to 25:75 with a preferred coprecipitate having a manganese oxides to zirconia ratio of 20:80. The percent of platinum supported on the coprecipitate based on platinum metal ranges from about 0.1 to 6, preferably from about 0.5 to 4, more preferably from about 1 to 4, and most preferably from about 2 to 4 weight percent. Preferably the catalyst is reduced. The catalyst can be reduced in powder form or after it has been coated onto a supporting substrate. Other useful compositions which can convert carbon monoxide to carbon dioxide include a platinum component supported on carbon or a support comprising manganese dioxide.

Catalysts to treat hydrocarbons, typically unsaturated hydrocarbons, more typically unsaturated mono-olefins having from two to about twenty carbon atoms and, in particular, from two to eight carbon atoms, and partially oxygenated hydrocarbons of the type referred to above, comprise at least one precious metal component, preferably selected from platinum and palladium with platinum being most preferred. Useful catalyst compositions include those described for use to treat carbon monoxide. Composition to treat hydrocarbons comprise from 0.01 to 20 wt. % and preferably 0.5 to 15 wt. % of the precious metal component on a suitable support such as a refractory oxide support, with the amount of precious metal being based on the weight of the precious metal, (not the metal component) and the support. Platinum is the most preferred and is preferably used in amounts of from 0.01 to 10 wt. % and more preferably 0.1 to 5 wt. % and most preferably 1.0 to 5 wt. %. When loaded onto a monolithic structure such as a motor vehicle radiator or on to other atmospheric contacting surfaces, the catalyst loading is preferably about 1 to 150, and more preferably 10 to 100 grams of platinum per cubic foot (g/ft$^3$) of catalyst volume. The preferred refractory oxide support is a metal oxide refractory which is preferably selected from ceria, silica, zirconia, alumina, titania and mixtures thereof with alumina and titania being most preferred. The preferred titania is characterized by as recited above with titania sol most preferred. The preferred catalyst is reduced.

Catalysts useful for the oxidation of both carbon monoxide and hydrocarbons generally include those recited above as useful to treat either carbon monoxide or hydrocarbons. Most preferred catalysts which have been found to have good activity for the treatment of both carbon monoxide and hydrocarbon such as unsaturated olefins comprise a platinum component supported on a preferred titania support. The composition preferably comprises a binder and can be coated on a suitable support structure in amounts of from about 0.8 to 1.0 g/in. A preferred platinum concentration ranges from about 2 to 6 and preferably from about 3 to 5 percent by weight of platinum metal on the titania support. Useful and preferred substrate cell densities are equivalent to about 300 to 400 cells per square inch. The catalyst is preferably reduced as a powder or on the coated article using a suitable reducing agent. Preferably the catalyst is reduced in the gas stream comprising about 7% hydrogen with the balance nitrogen at from about 200 to 500° C. for from about 1 to 12 hours. The most preferred reduction or forming temperature is 400° C. for from about 2 to 6 hours. This catalyst has been found to maintain high activity in air and humidified air at elevated temperatures of up to 100° C. after prolonged exposure.

Useful catalysts which can treat both ozone and carbon monoxide comprises at least one precious metal component, most preferably a precious metal selected from palladium, platinum and mixtures thereof on a suitable support such as a refractory oxide support. Useful refractory oxide supports comprise ceria, zirconia, alumina, titania, silica and mixtures thereof including a mixture of zirconia and silica as recited above. The composition comprises from about 0.1 to 20.0, preferably from about 0.5 to 15, and more preferably from about 1 to 10 weight percent of the precious metal component on the support based on the weight of the precious metal and the support. Palladium is preferably used in amounts from about 2 to 15 and more preferably from about 3 to 8 weight percent. Platinum is preferably used in amounts of from about 0.1 to 6 and more preferably from about 2 to 5 weight percent. A preferred composition is a composition wherein the refractory component comprises ceria and the precious metal component comprises palladium. This composition has resulted in relatively high ozone and carbon monoxide conversions.

Also preferred is a composition comprising a precious metal, preferably a platinum group metal, more preferably selected from platinum and palladium components, and most preferably a platinum component and the above recited coprecipitate of manganese oxide and zirconia. This above recited precious metal containing catalyst in the form of a catalyst powder or coating on a suitable substrate is in reduced form. Preferred reduction conditions include those recited above with the most preferred condition being from about 250 to 350° C. for from about 2 to 4 hours in a reducing gas comprising 7% hydrogen and 93% nitrogen. This catalyst has been found to be particularly useful in treating both carbon monoxide and ozone. Other useful compositions to convert ozone to oxygen and carbon monoxide to carbon dioxide comprise a platinum component supported on carbon, manganese dioxide, or a refractory oxide support additionally comprising a manganese component.

A useful and preferred catalyst which can treat ozone, carbon monoxide and hydrocarbons, as well as partially oxygenated hydrocarbons, comprises a precious metal component, preferably a platinum component on a suitable support such as a refractory oxide support. Useful refractory oxide supports comprise ceria, zirconia, alumina, titania, silica and mixtures thereof including a mixture of zirconia and silica as recited above. Also useful is a support including the above-recited coprecipitate of manganese oxide and zirconia.

The composition comprises from about 0.1 to 20, preferably from about 0.5 to 15 and more preferably 1 to 10 weight percent of the precious metal component on the refractory support based on the weight of the precious metal and the support. Where the hydrocarbon component is sought to be converted to carbon dioxide and water, platinum is the most preferred catalyst and is preferably used in amounts of from about 0.1 to 5 and more preferably from about 2 to 5 weight percent. In specific embodiments, there can be a combination of catalysts including the above recited catalyst as well as a catalyst which is particularly preferred for the treatment of ozone such as a catalyst comprising a manganese component. The manganese component can be optionally combined with a platinum component. The manganese and platinum can be on the same or different supports. There can be up to about 80, preferably up to about 50, more preferably from about 1 to 40 and yet more preferably from about 10 to 35 weight percent of the manganese component based on the weight of the precious metal and manganese in the pollutant treating composition. The catalyst loading is the same at that recited above with regard to the ozone catalyst. A preferred composition is a composition wherein the refractory component comprises an alumina or titania support and the precious metal component comprises a platinum component.

Catalyst activity, particularly to treat carbon monoxide and hydrocarbons can be further enhanced by reducing the catalyst in a forming gas such as hydrogen, carbon monoxide, methane or hydrocarbon plus nitrogen gas. Alternatively, the reducing agent can be in the form of a liquid such as a hydrazine, formic acid, and formate salts such as sodium formate solution. The catalyst can be reduced as a powder or after coating onto a substrate. The reduction can be conducted in gas at from about 150 to 500° C., preferably from about 200 to 400° C. for from about 1 to 12 hours, preferably from about 2 to 8 hours. In a preferred process, the coated article or powder can be reduced in a gas comprising 7% hydrogen in nitrogen at from about 275 to 350° C. for from about 2 to 4 hours.

An alternate composition for use in the method and apparatus of the present invention comprises a catalytically active material selected from the group consisting of precious metal components including platinum group metal components, gold components and silver components and a metal component selected from the group consisting of tungsten components and rhenium components. The relative amounts of catalytically active material to the tungsten component and/or rhenium component based on the weight of the metal are one from 1-25, to 15-1.

The composition containing a tungsten component and/or a rhenium component preferably comprises tungsten and/or rhenium in the oxide form. The oxide can be obtained by forming the composition using tungsten or rhenium salts and the composition can subsequently be calcined to form tungsten and/or rhenium oxide. The composition can comprise further components such as supports including refractory oxide supports, manganese components, carbon, and coprecipitates of a manganese oxide and zirconia. Useful refractory metal oxides include alumina, silica, titania, ceria, zirconia, chromia and mixtures thereof. The composition can additionally comprise a binder material, such as metal sols including alumina or titania sols or polymeric binder which can be provided in the form of a polymeric latex binder.

In preferred compositions, there are from 0.5 to 15, preferably 1 to 10, and most preferably from 3 to 5 percent by weight of the catalytically active material. The preferred catalytically active materials are platinum group metals with platinum and palladium being more preferred and platinum being most preferred. The amount of tungsten and/or rhenium component based on the metals ranges 1 to 25, preferably 2 to 15 and most preferably 3 to 10 weight percent. The amount of binder can vary from 0 to 20 weight percent, preferably 0.5 to 20, more preferably 2 to 10 and most preferably 2 to 5 weight percent. Depending on the support material a binder is not necessary in this composition. Preferred compositions comprise from 60 to 98.5 weight percent of a refractory oxide support, from 0.5 to 15 weight percent of the catalytically active material, from 1 to 25 weight of the tungsten and/or rhenium component, and from 0 to 10 weight percent binder.

Compositions containing the tungsten component and rhenium component can be calcined under conditions as recited above. Additionally, the composition can be reduced. However, as shown in the examples below, the compositions need not be reduced and the presence of the tungsten and/or rhenium component can result in conversions of carbon monoxide and hydrocarbons comparable to compositions containing platinum group metals which have been reduced.

The pollutant treating compositions of the present invention preferably comprise a binder which acts to adhere the composition to the atmosphere contacting surface of the pollutant treating device. It has been found that a preferred binder is a polymeric binder used in amounts of from about 0.5 to 20, more preferably from about 2 to 10, and most preferably from about 2 to 5 weight percent of binder based on the weight of the composition. Preferably, the binder is a polymeric binder which can be a thermosetting or thermoplastic polymeric binder. The polymeric binder can have suitable stabilizers and age resistors known in the polymeric art. The polymer can be a plastic or elastomeric polymer. Most preferred are thermosetting, elastomeric polymers introduced as a latex into the catalyst into a slurry of the catalyst composition, preferably an aqueous slurry. Upon application of the composition and heating the binder material can crosslink providing a suitable support which enhances the integrity of the coating, its adhesion to the substrate of the pollutant treating device and provides structural stability under vibrations encountered in motor vehicles. The use of a preferred polymeric binder enables the pollutant treating composition to adhere to the substrate without the necessity of an undercoat layer. The binder can comprise water resistant additives to improve water resistance and improve adhesion. Such additives can include fluorocarbon emulsions and petroleum wax emulsions.

Useful polymeric compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene), polyvinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex.

Particularly preferred polymers and copolymers are vinyl acrylic polymers and ethylene vinyl acetate copolymers. A preferred vinyl acrylic polymer is a cross linking polymer sold by National Starch and Chemical Company as Xlink 2833. It is described as a vinyl acrylic polymer having a Tg of −15° C., 45% solids, a pH of 4.5 and a viscosity of 300 cps. In particular, it is indicated to have vinyl acetate CAS No. 108-05-4 in a concentration range of less than 0.5 percent. It is indicated to be a vinyl acetate copolymer. Other preferred vinyl acetate copolymers which are sold by the National Starch and Chemical Company include Dur-O-Set E-623 and Dur-O-Set E-646. Dur-O-Set E-623 is indicated to be ethylene vinyl acetate copolymers having a Tg of 0° C., 52% solids, a pH of 5.5 and a viscosity of 200 cps. Dur-O-Set E-646 is indicated to be an ethylene vinyl acetate copolymer with a Tg of −12° C., 52% solids, a pH of 5.5 and a viscosity of 300 cps.

An alternate and useful binding material is the use of a zirconium compound. Zirconyl acetate is a preferred zirconium compound. It is believed that zirconia acts as a high temperature stabilizer, promotes catalytic activity, and improves catalyst adhesion. Upon calcination, zirconium compounds such as zirconyl acetate are converted to $ZrO_2$ which is believed to be the binding material. Various useful zirconium compounds include acetates, hydroxides, nitrates, etc. for generating $ZrO_2$ in catalysts. In the case of using zirconyl acetate as a binder for the present catalysts, $ZrO_2$ will not be formed unless the coating is calcined. Since good adhesion has been attained at a "calcination" temperature of only 120° C., it is believed that the zirconyl acetate has not decomposed to zirconium oxide but instead has formed some kind of cross linked network with the pollutant treating material such as Carulite® particles and the acetates which were formed from ball milling with acetic acid. Accordingly, the use of any zirconium containing compounds in the present catalysts are not restricted only to zirconia. Additionally, the zirconium compounds can be used with other binders such as the polymeric binder recited above.

An alternate pollutant treating catalyst composition can comprise activated carbon composition. The carbon composition comprises activated carbon, a binder, such as a polymeric binder, and optionally conventional additives such as defoamers and the like. A useful activated carbon composition comprises from about 75 to 85 weight percent activated carbon such as "coconut shell" carbon and a binder such as an acrylic binder with a defoamer. Useful slurries comprise from about 10 to 50 weight percent solids. The activated carbon can reduce ozone to oxygen, as well as adsorb other pollutants.

Pollutant treating catalyst compositions of the present invention can be prepared in any suitable process. A preferred process is disclosed in U.S. Pat. No. 4,134,860 hereby incorporated by reference. In accordance with this method, the refractory oxide support such as activated alumina or activated silica alumina is jet milled, impregnated with a catalytic metal salt, preferably precious metal salt solution and calcined at a suitable temperature, typically from about 300 to 600° C. preferably from about 350 to 550° C. and more preferably from about 400 to 500° C. for from about 0.5 to 12 hours. Palladium salts are preferably a palladium nitrate or a palladium amine such as palladium tetraamine acetate, or palladium tetraamine hydroxide. Platinum salts preferably include platinum hydroxide solubilized in an amine. In specific and preferred embodiments the calcined catalyst is reduced as recited above.

In an ozone treating composition, a manganese salt, such as manganese nitrate, can then be mixed with the dried and calcined alumina supported palladium in the presence of deionized water. The amount of water added should be an amount up to the point of incipient wetness. Reference is made to the method reviewed in the above referenced and incorporated U.S. Pat. No. 4,134,860. The point of incipient wetness is the point at which the amount of liquid added is the lowest concentration at which the powdered mixture is sufficiently dry so as to absorb essentially all of the liquid. In this way a soluble manganese salt such as $Mn(NO_3)_2$ in water can be added into the calcined supported catalytic precious metal. The mixture is then dried and calcined at a suitable temperature, preferably from about 400 to 500° C. for from about 0.5 to 12 hours.

Alternatively, the supported catalytic powder (i.e., palladium supported on alumina) can be combined with a liquid, preferably water, to form a slurry to which a solution of a manganese salt such as $Mn(NO_3)_2$ is added. Preferably, the manganese component and palladium supported on a refractory support such as activated alumina, more preferably activated silica-alumina is mixed with a suitable amount of water to result in a slurry having from about 15 to 40 and preferably from about 20 to 35 weight percent solids. The combined mixture can be coated onto a substrate and dried in air at suitable conditions such as from about 50 to 150° C. for from about 1 to 12 hours. The substrate such as metal or ceramic which supports the coating can then be heated in an oven at suitable conditions typically from about 300 to 550° C., preferably from about 350 to 550° C., more preferably from about 350 to 500° C. and most preferably from about 400 to 500° C. in air for from about 0.5 to 12 hours to calcine the components and help to secure the coating to the substrate. Where the composition further comprises a precious metal component, it is preferably reduced after calcining.

The method of the present invention includes forming a mixture comprising a catalytically active material selected from at least one platinum group metal component, a gold component, a silver component, a manganese component and water. The catalytically active material can be on a suitable support, preferably a refractory oxide support. The mixture can be milled, calcined and optionally reduced. The calcining step can be conducted prior to adding the polymeric binder. It is also preferred to reduce the catalytically active material prior to adding the polymeric binder. The slurry comprises a carboxylic acid compound or polymer containing carboxylic acid in an amount to result in a pH of about from 3 to 7, typically 3 to 6, and preferably from 0.5 to 15 weight percent of glacial acetic acid based on the weight of the catalytically active material and acetic acid. The amount of water can be added as suited to attain a slurry of the desired viscosity. The percent solids are typically 20 to 50 and preferably 30 to 40 percent by weight. The preferred vehicle is deionized water (D.I.). The acetic acid can be added upon forming the mixture of the catalytically active material, which may have been calcined, with water. Alternatively, the acetic acid can be added with the polymeric binder. A preferred composition to treat ozone using manganese dioxide as the catalyst can be made using about 1,500 g of manganese dioxide which is mixed with 2,250 g of deionized water and 75 g or acetic acid. The mixture is combined in a 1 gallon ballmill and ballmilled for about 8 hours until approximately 90% of the particles are less than 8 micrometers. The ballmill is drained and 150 g of polymeric binder is added. The mixture is then blended on a rollmill for 30 minutes. The resulting mixture is ready for coating onto a suitable substrate.

The pollutant treating composition can be applied to the substrate to form the pollutant treating device by any suitable means such as spray coating, powder coating, or brushing or dipping the surface into a catalyst slurry.

The substrate, such as metal or ceramic is preferably cleaned to remove surface dirt, particularly oils which could result in poor adhesion of the pollutant treating composition to the surface. Where possible, it is preferred to heat the substrate on which the surface is located to a high enough temperature to volatilize or burn off surface debris and oils.

Where the substrate on which the pollutant treating composition is applied, is made of a material which can withstand elevated temperatures such as metal, the substrate surface can be treated in such a manner as to improve adhesion to the catalyst composition, preferably the ozone, carbon monoxide, and/or hydrocarbon catalyst composition. One method is to heat a metal substrate to a sufficient temperature in air for a sufficient time to form a thin layer on the surface (e.g. oxide layer). This helps clean the surface by removing oils which may be detrimental to adhesion. Additionally, if the surface is a metal a sufficient layer of oxidized metal has been found to be able to be formed by heating the metal in air for from about 0.5 to 24, preferably from about 8 to 24 and more preferably from about 12 to 20 hours at from about 350 to 500° C., preferably from about 400 to 500° C. and more preferably from about 425 to 475° C. In some cases, sufficient adhesion without the use of an undercoat layer has been attained where the substrate has been heated at 450° C. for 16 hours in air.

Adhesion may improve by applying an undercoat or precoat to the substrate. Useful undercoats or precoats include refractory oxide supports of the type discussed above, with alumina preferred. A preferred undercoat to increase adhesion between the substrate and an overcoat of an ozone catalyst composition is described in commonly assigned U.S. Pat. No. 5,422,331 hereby incorporated herein by reference. The undercoat layer is disclosed as comprising a mixture of fine particulate refractory metal oxide and a sol selected from silica, alumina, zirconia and titania sols.

The present invention can comprise adsorption compositions supported on the substrate of the pollutant treating composition. The adsorption compositions can be used to adsorb gaseous pollutants such as hydrocarbons and sulfur dioxide as well as particulate matter such as particulate hydrocarbon, soot, pollen, bacteria and germs. Useful supported compositions can include adsorbents such as zeolite to adsorb hydrocarbons. Useful zeolitic compositions are described in Publication No. WO 94/27709 published Dec. 8, 1994 and entitled "Nitrous Oxide Decomposition Catalyst", hereby incorporated herein by reference. Particularly preferred zeolites are Beta zeolite, and dealuminated Zeolite Y.

Carbon, preferably activated carbon, can be formed into carbon adsorption compositions comprising activated carbon and binders such as polymers as known in the art. The carbon adsorption composition can be applied to the atmosphere contacting surface. Activated carbon can adsorb hydrocarbons, volatile organic components, bacteria, pollen and the like. Yet another adsorption composition can include components which can adsorb $SO_3$. A particularly useful $SO_3$ adsorbent is calcium oxide. The calcium oxide is converted to calcium sulfate. The calcium oxide adsorbent compositions can also contain a vanadium or platinum catalyst which can be used to convert sulfur dioxide to sulfur trioxide which can then be adsorbed onto the calcium oxide to form calcium sulfate.

More than one pollutant treating device containing the catalyst compositions as described above may be placed within the bracket assembly. The spaced apart pollutant treating devices provide for an increase in gas turbulence to increase the residence time of the incoming gas over the catalytic surfaces. This improves the efficiency of the pollutant removal operation.

Figure 3:
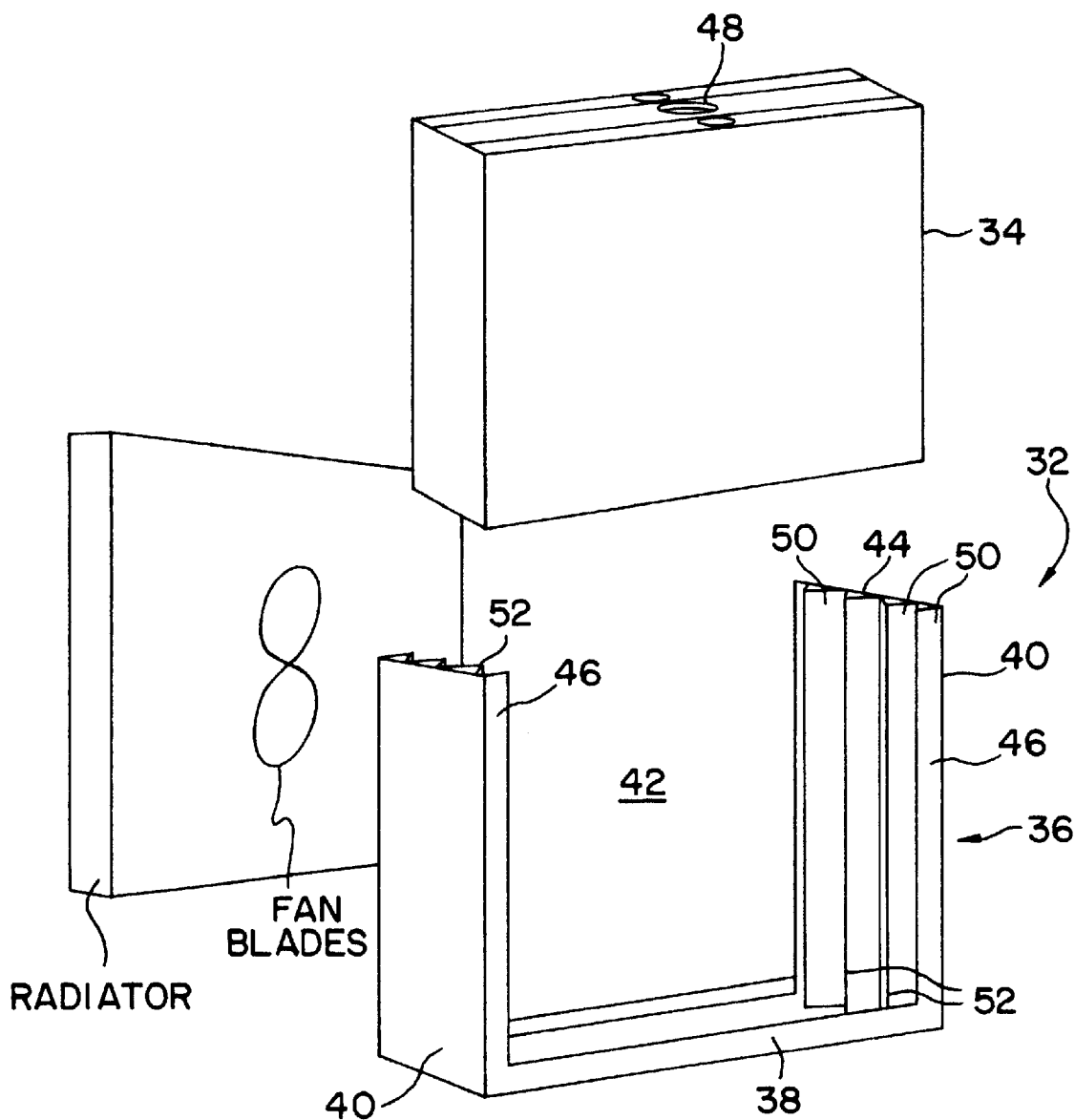
FIG. 3 is a schematic view similar to FIG. 2 showing multiple pollutant treating devices within a single support.

Referring to FIG. 3 there is shown a bracket assembly 36 having a plurality of (three are shown) compartments 50 formed by exterior flange 46 and internal flanges 52. Insertable into each compartment 50 is a housing 34 containing the catalyst composition on a suitable substrate Each of the housings 34 may be removed, replaced and/or washed and reinserted as described above in connection with the embodiment of FIG. 2.

In another embodiment of the invention, the pollutant treating device can be in the form of at least one cartridge, preferably cylindrical which contains the pollutant treating composition. The cartridge may be supported within the engine compartment of the motor vehicle by a support means such as a complimentary shaped bracket assembly.

Figure 4:
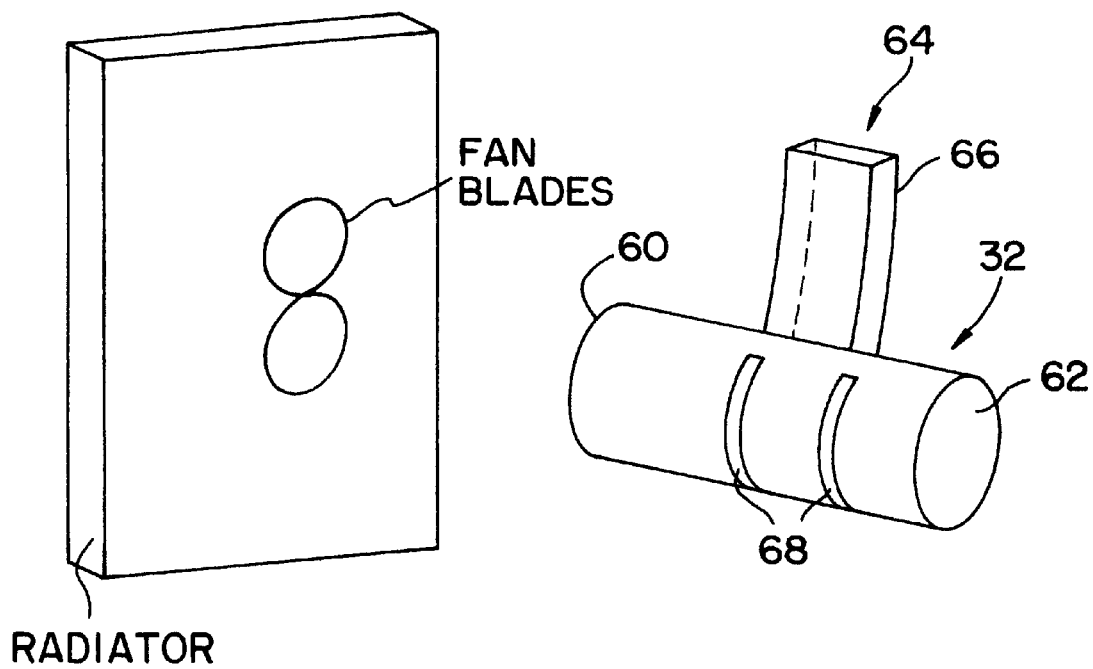
FIG. 4 is a perspective view of another embodiment of a single pollutant treating device of the present invention.

Referring to FIG. 4, there is shown a pollutant treating device 32 having a cylindrical shape. The device is shown for illustrative purposes only positioned behind the radiator and fan. The device 32 has a front end 60 and a rear end 62. Ambient air passing through the radiator passes through the device 32 from the front end 60 to the rear end 62. During its flow path through the device the ambient air contacts the catalyst composition contained therein as previously described where pollutants contained within the ambient air are converted to harmless by-products or are adsorbed.

The substrate for the pollutant treating composition can be selected from a monolith, foam mesh or spun fiber. The preferred substrate is a monolith or honeycomb design comprised of a support and a catalyst or an adsorbent.

Preferred substrates are monolithic carriers of the type having a plurality of fine, parallel gas flow passages extending therethrough from an inlet face to an outlet face of the carrier so that the passages are open to air flow entering from the front and passing through the monolith and out the rear. Preferably the passages are essentially straight from their inlet to their outlet and are defined by walls in which the catalytic material is coated as a wash coat so that the gases flowing through the passages contact the catalytic material. The flow passages of the monolithic carrier are thin wall channels which can be of any suitable cross-sectional shape and size such as trapezoidal, rectangular, square, sinusoidal, hexagonal, oval, circular or formed from metallic components which are corrugated and flat as are known in the art. Such structures may contain from about 60 to 600 or more gas inlet openings ("cells") per square inch of cross section.

The pollutant treating device 32 shown in FIG. 4 can be supported in the engine compartment of a motor vehicle through the use of a bracket assembly 64. The bracket assembly includes a body 66 and a pair of spaced apart arms 68 which can be secured around at least a portion of the perimeter of the pollutant treating device 32. When the device needs to be replaced or removed for cleaning, it is lifted out of contact with the arms 68 and removed. A new device or the old device that has been cleaned can then be readily inserted into the bracket assembly 64 by inserting the same between the body 66 and the arms 68.

Figure 5:
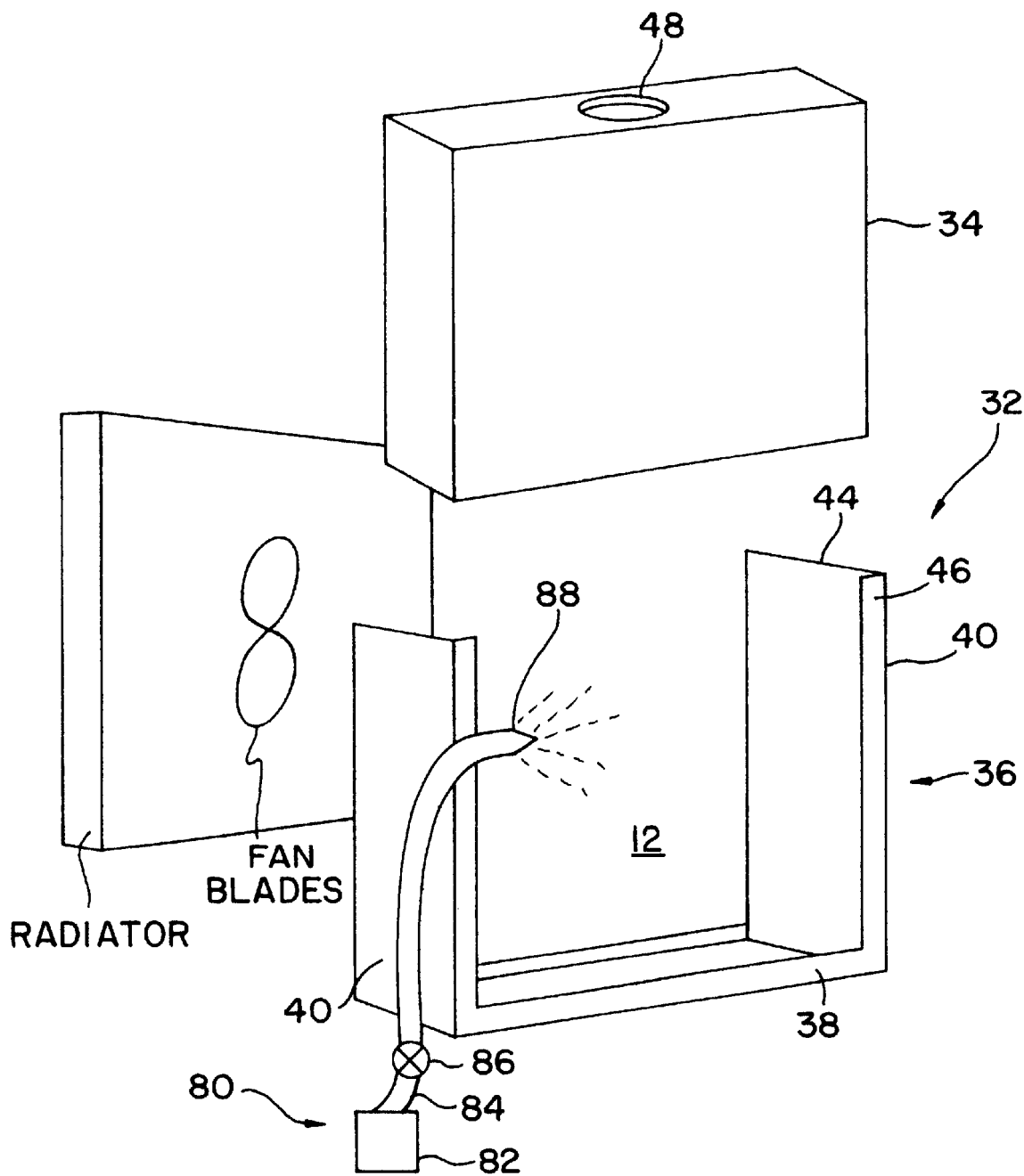
FIG. 5 is a schematic view similar to FIG. 2 showing a cleaning assembly for cleaning the pollutant treating device.
Figure 6:
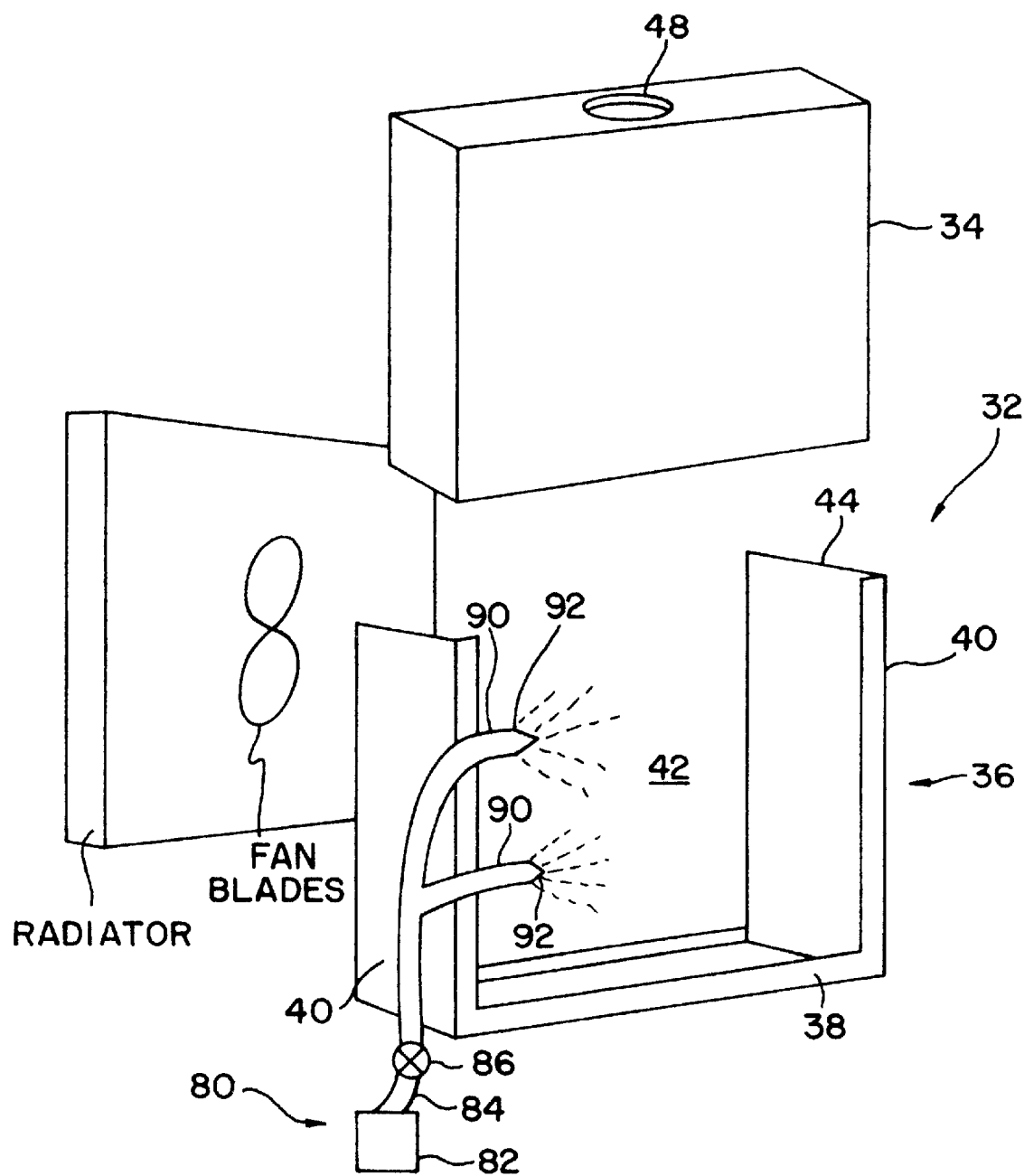
FIG. 6 is a schematic view similar to FIG. 5 showing another embodiment of a cleaning assembly for cleaning the pollutant treating device.

The pollutant treating device containing the substrate with the catalyst composition thereon may be removed for washing and regeneration or can be regenerated without removing the housing from the bracket. Referring to FIGS. 5 & 6, there is shown a pollutant treating device like that shown in FIG. 2 provided with a built-in washing system. Specifically, the washing system 80 includes a source of washing fluid 82 such as water. The washing fluid flows through a main conduit 84 through the action of a pump 86 which may be operatively connected to the dashboard (not shown) of the motor vehicle.

The main conduit 84 is attached to a nozzle 88 which is capable of ejecting a spray of the washing fluid onto the catalytic surfaces of the housing. A single nozzle 88 may be used as shown in FIG. 5 or, as shown in FIG. 6, the main conduit 84 may be branched in two or more secondary conduits 90 (two secondary conduits are shown). Each secondary conduit 90 is provided with its own nozzle 92 for ejecting the washing fluid over the pollutant treating device. Multiple nozzles 92 are preferred because they can provide better coverage of the pollutant treating device with the washing fluid.

The method and apparatus of the present invention are preferably designed so that the pollutants can be treated at ambient conditions, requiring no heating means or incidental heat. It is preferred however, that the pollutant treating device be placed in proximity to a heat source to elevate the temperature of the ambient air flowing to the device. As previously indicated the pollutant device can be placed upstream of a radiator or heat exchanger or in proximity to any engine compartment component that generates heat so long as the pollutant treating device is in a natural flow pattern of ambient air. Air coming into contact with the radiator is then heated and the heated air then contacts the pollutant treating device where pollutants contained therein are converted to harmless by-products.

Figure 7:
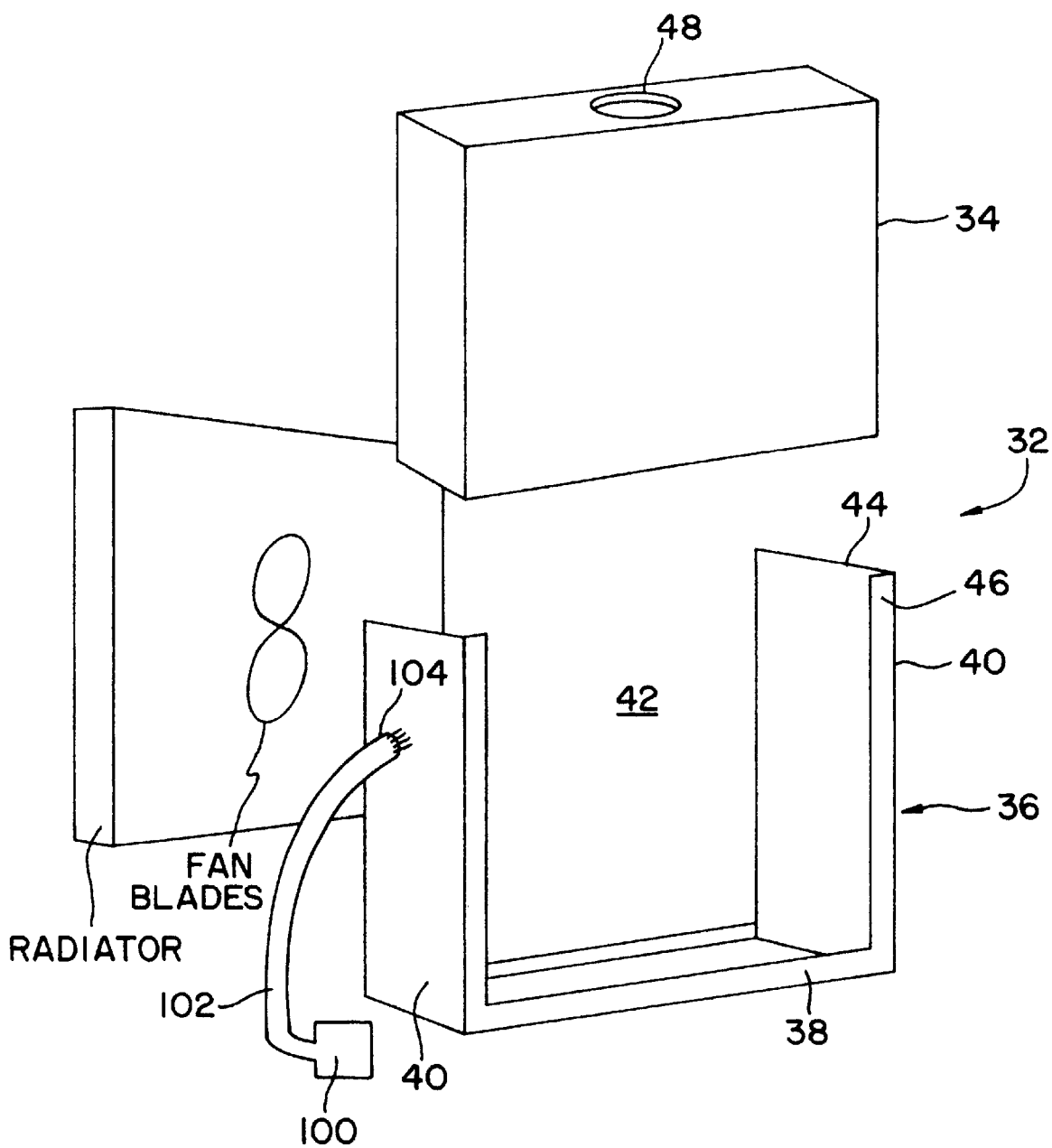
FIG. 7 is a schematic view similar to FIG. 2 showing a heat circulation unit for heating the air before contacting the pollutant treating device.

Heat can also be transmitted to the ambient air by recirculating waste heat from a source such as the exhaust system, the motor or the like. Referring to FIG. 7 there is shown an embodiment of the invention where waste heat from a source 100 is transmitted to the pollutant treating device 32. The waste heat is transmitted via a conduit 102 to a nozzle 104 where it is ejected transverse to the flow direction of the ambient air, thereby raising the temperature of the ambient air.

In a further embodiment of the invention, the pollutant treating device itself can be heated to thereby raise the temperature of the ambient air passing therethrough.

Figure 8:
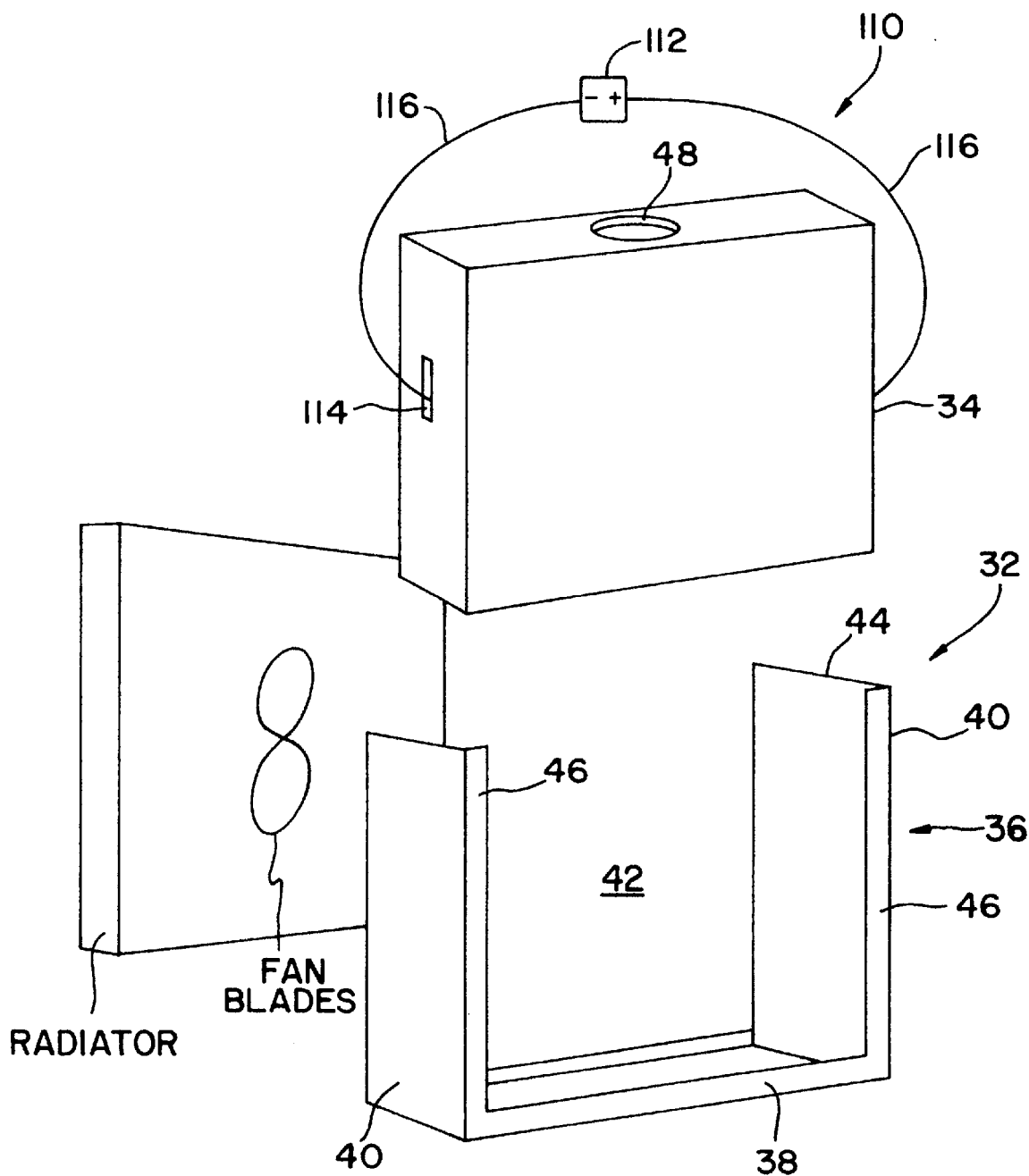
FIG. 8 is a schematic view similar to FIG. 2 showing a heating assembly for heating the pollutant treating device.

Referring to FIG. 8, the pollutant treating device 32 is provided with an electronic heating assembly 110 including a source of electrical energy 112 (e.g. a battery) and resistor elements 114 positioned on opposed sides of the housing 34. The resistor elements 114 are connected to the source 112 through respective conductor leads 116. In operation, electrical energy is forwarded to the resistor elements 114 to generate heat in proximity to the catalyst composition contained within the housing. As the ambient air contacts the catalyst composition, the catalytic reaction is promoted because the catalyst composition is at an elevated temperature. For purposes of this embodiment of the invention the electrically heated catalyst is preferably a metal or ceramic honeycomb having a suitable thickness to fit in the flow direction, preferably of from about ⅛ inch to 12 inches, and more preferably from about 0.5 to 3 inches. Where the electrically heated catalyst must fit into a narrow space, it can be from about 0.25 to 1.5 inches thick. Preferred substrates for this embodiment of the invention are monolithic carriers of the type having a plurality of fine, parallel gas flow passages extending therethrough from an inlet face to an outlet face of the carrier so that the passages are open to air flow entering from the front and passing through the monolith and out the rear. Preferably the passages are essentially straight from their inlet to their outlet and are defined by walls in which the catalytic material is coated as a wash coat so that the gases flowing through the passages contact the catalytic material. The flow passages of the monolithic carrier are thin wall channels which can be of any suitable cross-sectional shape and size such as trapezoidal, rectangular, square, sinusoidal, hexagonal, oval, circular or formed from metallic components which are corrugated and flat as are known in the art. Such structures may contain from about 60 to 600 or more gas inlet openings ("cells") per square inch of cross section. The monolith may be made of any suitable material and is preferably capable of being heated upon application of an electric current. A useful catalyst to apply is the three way catalyst (TWC) as recited above which can enhance the oxidation of hydrocarbons and carbon monoxide as well as the reduction of nitrogen oxides. Useful TWC catalysts are recited in U.S. Pat. Nos. 4,714,694; 4,738,947; 5,010,051; 5,057,483; and 5,139,992.

EXAMPLE 1

A 1993 Nissan Altima radiator core (Nissan part number 21460-1E400) was heat treated in air to 450° C. for 16 hours to oxidize the surface and then a portion coated with high surface area silica-alumina undercoat (dry loading=0.23 g/in$^3$) by pouring a water slurry containing the silica-alumina through the radiator channels, blowing out the excess with an air gun, drying at room temperature with a fan, and then calcining to 450° C. The silica-alumina slurry was prepared by ball milling high surface area calcined SRS-II alumina (Davison) with acetic acid (0.5% based on alumina) and water (total solids ca. 20%) to a particle size of 90%<4 μm. The ball milled material was then blended with Nalco silica sol (#91SJ06S-28% solids) in a ratio of 25%/75%. The SRS-II alumina is specified to have a structure of $xSiO_2 \cdot yAl_2O_3 \cdot zH_2O$ with 92–95% by weight $Al_2O_3$ and 4–7% by weight $SiO_2$ after activation. BET surface area is specified to be a minimum of 260 m$^2$/g after calcination.

A $Pd/Mn/Al_2O_3$ catalyst slurry (nominally 10% by weight palladium on alumina) was prepared by impregnating high surface area SRS-II alumina (Davison) to the point of incipient wetness with a water solution containing sufficient palladium tetraamine acetate. The resulting powder was dried and then calcined for 1 hour at 450° C. The powder was subsequently mixed under high shear with a water solution of manganese nitrate (amount equivalent to 5.5% by weight $MnO_2$ on the alumina powder) and sufficient dilution water to yield a slurry of 32–34% solids. The radiator was coated with the slurry, dried in air using a fan, and then calcined in air at 450° C. for 16 hours. This ozone destruction catalyst contained palladium (dry loading=263 g/ft$^3$ of radiator volume) and manganese dioxide (dry loading=142 g/ft$^3$) on high surface area SRS-II alumina. The partially coated radiator reassembled with the coolant headers is shown in FIG. 7.

Ozone destruction performance of the coated catalyst was determined by blowing an air stream containing a given concentration of ozone through the radiator channels at face velocities typical of driving speeds and then measuring the concentration of ozone exiting the back face of the radiator. The air had a temperature of about 20° C. and had a dew point of about 35° F. Ozone concentrations ranged from 0.1–0.4 ppm. Ozone conversion was measured at linear air velocities (face velocities) equivalent to 12.5 miles per hour to be 43%; at 25 mph to be 33%; at 37.5 mph to be 30% and at 49 mph to be 24%.

EXAMPLE 2 (COMPARATIVE)

A portion of the same radiator used in Example 1 which was not coated with catalyst was similarly evaluated for ozone destruction performance (i.e. control experiment). No conversion of ozone was observed.

EXAMPLE 3

A 1993 Nissan Altima radiator core (Nissan part number 21460-1E400) was heat treated in air to 400° C. for 16 hours and then a portion coated with Condea high surface area SBA-150 alumina (dry loading=0.86 g/in$^3$) by pouring a water slurry containing the alumina through the radiator channels, blowing out the excess with an air gun, drying at room temperature with a fan, and then calcining to 400° C. The alumina precoat slurry was prepared as described in Example 3. The radiator was then coated sequentially in 2"×2" square patches with seven different CO destruction catalysts (Table II). Each coating was applied by pouring a water slurry containing the specific catalyst formulation through the radiator channels, blowing out the excess with an air gun, and drying at room temperature with a fan.

The Carulite® and 2% $Pt/Al_2O_3$ catalysts (Patch #4 and #6, respectively) were prepared according to the procedure described in Example 3. The 3% $Pt/ZrO_2/SiO_2$ catalyst (Patch #3) was made by first calcining 510 g of zirconia/silica frit (95% $ZrO_2$/5%$SiO_2$—Magnesium Elektron XZO678/01) for 1 hour at 500° C. A catalyst slurry was then prepared by adding to 480 g of deionized water, 468 g of the resulting powder, 42 g of glacial acetic acid, and 79.2 g of a platinum salt solution (18.2% Pt) derived from $H_2Pt(OH)_6$ solubilized with an amine. The resulting mixture was milled on a ball mill for 8 hours to a particle size of 90% less than 3μm.

The 3% $Pt/TiO_2$ catalyst (Patch #7) was prepared by mixing in a conventional blender 500 g of $TiO_2$ (Degussa P25), 500 g of deionized water, 12 g of concentrated ammonium hydroxide, and 82 g of a platinum salt solution (18.2% Pt) derived from $H_2Pt(OH)_6$ solubilized with an amine. After blending for 5 minutes to a particle size of 90% less than 5 μm, 32.7 g of Nalco 1056 silica sol and sufficient deionized water to reduce the solids content to ca. 22% was added. The resulting mixture was blended on a roll mill to mix all ingredients.

The 3% $Pt/Mn/ZrO_2$ catalyst slurry (Patch #5) was prepared by combining in a ball mill 70 g of manganese/zirconia trit comprising a coprecipitate of 20 weight percent manganese and 80 weight percent zirconium based on metal weight (Magnesium Elektron XZO719/01), 100 g of deionized water, 3.5 g of acetic acid and 11.7 g of a platinum salt solution (18.2% Pt) derived from $H_2Pt$ $(OH)_6$ solubilized with an amine. The resulting mixture was milled for 16 hours to a particle size 90% less than 10 μm.

The 2% $Pt/CeO_2$ catalyst (Patch #1) was prepared by impregnating 490 g of alumina stabilized high surface area ceria (Rhone Poulenc) with 54.9 g of a platinum salt solution (18.2% Pt) derived from $H_2Pt(OH)_6$ solubilized with an amine and dissolved in deionized water (total volume-155 mL). The powder was dried at 110° C. for 6 hours and calcined at 400° C. for 2 hours. A catalyst slurry was then prepared by adding 491 g of the powder to 593 g of deionized water in a ball mill and then milling the mixture for 2 hours to a particle size of 90% less than 4 μm. The 4.6% $Pd/CeO_2$ catalyst (Patch #2) was prepared similarly via incipient wetness impregnation using 209.5 g (180 mL) of palladium tetraamine acetate solution.

After all seven catalysts were applied, the radiator was calcined for about 16 hours at 400° C. After attaching the radiator core to the plastic tanks, CO destruction performance of the various catalysts were determined by blowing an air stream containing CO (ca. 16 ppm) through the radiator channels at a 5 mph linear face velocity (315,000/h space velocity) and then measuring the concentration of CO exiting the back face of the radiator. The radiator temperature was ca. 95° C., and the air stream had a dew point of approximately 35° F. Results are summarized in Table II.

Figure 9:
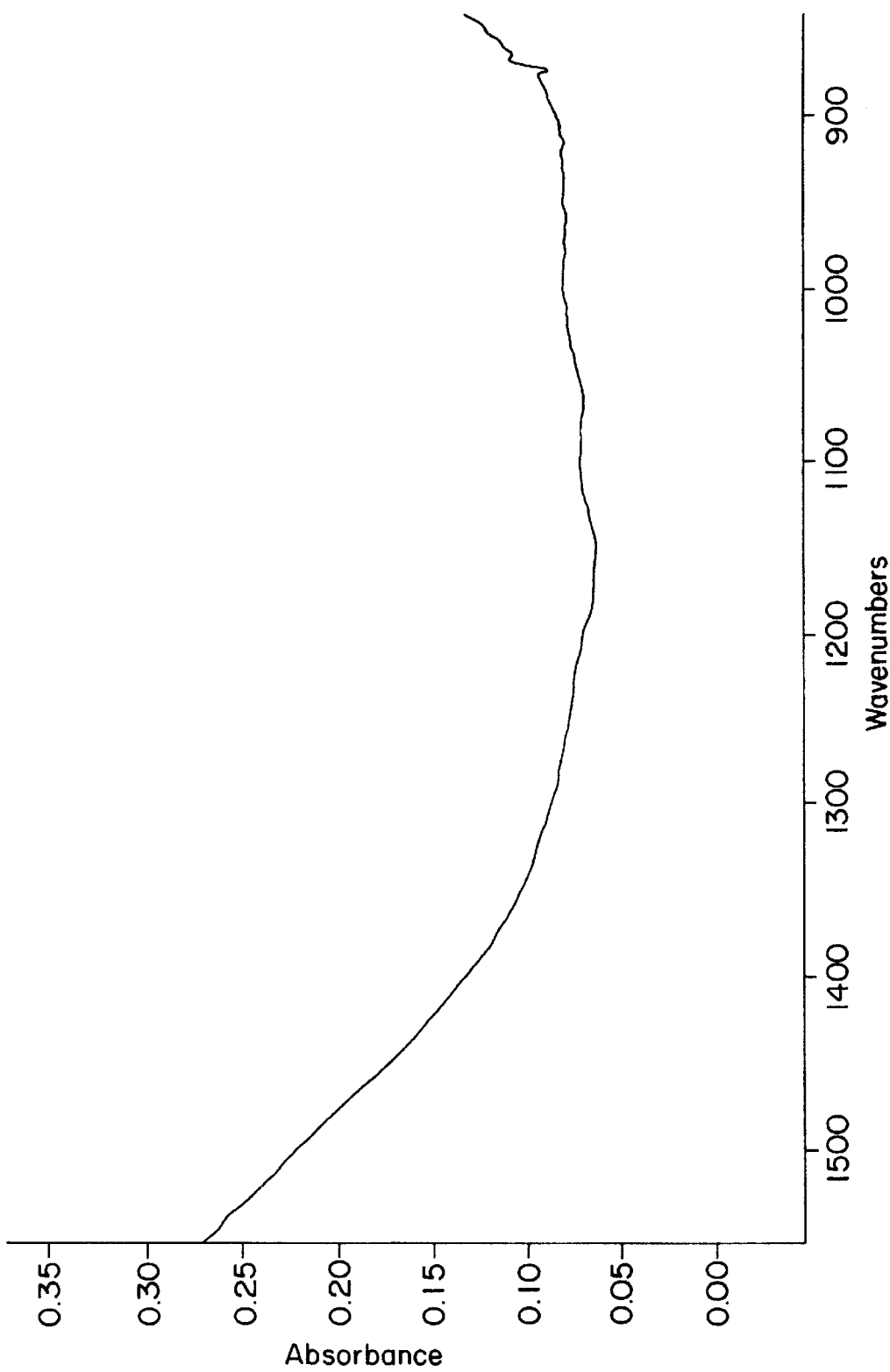
FIG. 9 is an IR spectrum for cryptomelane.

Ozone destruction performance was measured as described in Example 1 at 25° C., 0.25 ppm ozone, and a linear face velocity of 10 mph with a flow of 135.2 L/min and an hourly space velocity of 640,000/h. The air used had a dewpoint of 35° F. Results are summarized in Table II. FIG. 9 illustrates CO conversion v. temperature for Patch Nos. 3, 6 and 7.

The catalysts were also tested for the destruction of propylene by blowing an air stream containing propylene (ca. 10 ppm) through the radiator channels at a 5 mph linear face velocity, with a flow rate of 68.2 L/min and an hourly space velocity of 320,000/h, and then measuring the concentration of propylene exiting the back face of the radiator. The radiator temperature was ca. 95° C., and the air stream had a dew point of approximately 35° F. Results are summarized in Table I.

TABLE I

CO/HC/OZONE CONVERSION SUMMARY

| PATCH # | CATALYST | CARBON MONOXIDE CONVERSION (%)[1] | OZONE CONVERSION (%)[2] | PROPYLENE CONVERSION (%)[3] |
|---|---|---|---|---|
| 1 | 2% Pt/CeO$_2$ 0.7g/in$^3$ (24 g/ft$^3$ Pt) | 2 | 14 | 0 |
| 2 | 4.6% Pd/CeO$_2$ 0.5 g/in$^3$ (40 g/ft$^3$ Pd) | 21 | 55 | 0 |
| 3 | 3% Pt/ZrO$_2$/ SiO$_2$ 0.5 g/in$^3$ (26 g/ft$^3$ Pt) | 67 | 14 | 2 |
| 4 | Carulite 200 0.5 g/in$^3$ 3% SiO$_2$/ Al$_2$O$_3$ binder | 5 | 56 | 0 |
| 5 | 3% Pt/Mn/ZrO$_2$ 0.7 g/in$^3$ (36 g/ft$^3$ Pt) | 7 | 41 | 0 |
| 6 | 2% Pt/Al$_2$O$_3$ 0.5 g/in$^3$ (17 g/ft$^3$ Pt) | 72 | 8 | 17 |
| 7 | 3% Pt/TiO$_2$ 0.7 g/in$^3$ (36 g/ft$^3$ Pt) 3% SiO$_2$/ Al$_2$O$_3$ binder | 68 | 15 | 18 |

[1]Test Conditions: 16 ppm CO; 95° C.; 5 mph face velocity; 68.2 L/min; LHSV (hourly space velocity) = 320,000/h; Air dewpoint = 35° F.
[2]Test Conditions: 0.25 ppm O$_3$; 25° C.; 10 mph face velocity; 135.2 L/min; LHSV (hourly space velocity) = 640,000/Air dewpoint = 35° F.
[3]Test Conditions: 10 ppm propylene; 95° C.; 5 mph face velocity; 68.2 L/min; LHSV (hourly space velocity) = 320,000/h; Air dewpoint = 35° F.

EXAMPLE 4

After heat treatment for 60 hours in air at 450° C., a Lincoln Town Car radiator core (part #F1VY-8005-A) was coated sequentially in 6"×6" square patches with a variety of different ozone destruction catalyst compositions (i.e., different catalysts; catalyst loadings, binder formulations, and heat treatments). Several of the radiator patches were precoated with a high surface area alumina or silica-alumina and calcined to 450° C. prior to coating with the catalyst. The actual coating was accomplished similarly to Example 1 by pouring a water slurry containing the specific catalyst formulation through the radiator channels, blowing out the excess with an air gun, and drying at room temperature with a fan. The radiator core was then dried to 120° C., or dried to 120° C. and then calcined to 400 to 450° C. The radiator core was then reattached to its plastic tanks and ozone destruction performance of the various catalysts was determined at a radiator surface temperature of about 40° C. to 50° C. and a face velocity of 10 mph as described in Example 1.

Table I summarizes the variety of catalysts coated onto the radiator. Details of the catalyst slurry preparations are given below.

A Pt/Al$_2$O$_3$ catalyst (nominally 2% by weight Pt on Al$_2$O$_3$) was prepared by impregnating 114 g of a platinum salt solution derived from H$_2$Pt(OH)$_6$ solubilized in an amine, (17.9% Pt), dissolved in 520 g of water to 1000 g of Condea SBA-150 high surface area (specified to be about 150 m$^2$/g) alumina powder. Subsequently 49.5 g of acetic acid was added. The powder was then dried at 110° C. for 1 hour and calcined at 550° C. for 2 hours. A catalyst slurry was then prepared by adding 875 g of the powder to 1069 g of water and 44.6 g of acetic acid in a ball mill and milling the mixture to a particle size 90%<10 μm. (Patches 1 and 4)

A carbon catalyst slurry was a formulation (29% solids) purchased from Grant Industries, Inc., Elmwood Park, N.J. The carbon is derived from coconut shell. There is an acrylic binder and a defoamer. (Patches 8 and 12)

The Carulite® 200 catalyst (CuO/MnO$_2$) was prepared by first ball milling 1000 g of Carulite® 200 (purchased from Carus Chemical Co., Chicago, Ill.) with 1500 g of water to a particle size 90%<6 μm. Carulite® 200 is specified as containing 60 to 75 weight percent MnO$_2$, 11–14 percent CuO and 15–16 percent Al$_2$O$_3$. The resulting slurry was diluted to ca. 28% solids and then mixed with either 3% (solids basis) of Nalco #1056 silica sol or 2% (solids basis) National Starch #x4260 acrylic copolymer. (Patches 5, 9 and 10)

The Pd/Mn/Al$_2$O$_3$ catalyst slurry (nominally 10% by weight palladium on alumina) was prepared as described in Example 1. (Patches 2, 3 and 6)

An I.W. (incipient wetness) Pd/Mn/Al$_2$O$_3$ catalyst (nominally 8% palladium and 5.5% MnO$_2$ based on alumina) was prepared similarly by first impregnating high surface area SRS-II alumina (Davison) to the point of incipient wetness with a water solution containing palladium tetraamine acetate. After drying and then calcining the powder for two hours at 450° C., the powder was reimpregnated to the point of incipient wetness with a water solution containing manganese nitrate. Again, after drying and calcination at 450° C. for two hours, the powder was mixed in a ball mill with acetic acid (3% by weight of catalyst powder) and enough water to create a slurry of 35% solids. The mixture was then milled until the particle size was 90%<8 μm. (Patches 7 and 11)

The SiO$_2$/Al$_2$O$_3$ precoat slurry was prepared as described in Example 1. (Patches 3 and 11)

The Al$_2$O$_3$ precoat slurry was prepared by ball milling high surface area Condea SBA-150 alumina with acetic acid (5% by weight based on alumina) and water (total solids ca. 44%) to a particle size of 90%<10 μm. (Patches 9 and 12)

Results are summarized in Table I. The conversion of carbon monoxide after being on the automobile for 5,000 miles was also measured at the conditions recited in Example 1 for patch #4. At a radiator temperature of 50° C. and a linear velocity of 10 mph no conversion was observed.

TABLE II

CATALYST SUMMARY

| PATCH # | CATALYST | OZONE CONVERSION (%) |
|---|---|---|
| 1 | $Pt/Al_2O_3$<br>0.67 g/in$^3$ (23 g/ft$^3$ Pt)<br>No Precoat<br>No Calcine (120° C. only) | 12 |
| 2 | $Pd/Mn/Al_2O_3$<br>0.97 g/in$^3$ (171 g/ft$^3$ Pd)<br>No Precoat<br>Calcined 450° C. | 25 |
| 3 | $Pd/Mn/Al_2O_3$<br>1.19 g/in$^3$ (209 g/ft$^3$ Pd)<br>$SiO_2/Al_2O_3$ Precoat (0.16 g/in$^3$)<br>Calcined 450° C. | 24 |
| 4 | $Pt/Al_2O_3$<br>0.79 g/in$^3$ (27 g/ft$^3$ Pt)<br>No Precoat<br>Calcined 450° C. | 8 |
| 5 | Carulite 200<br>0.49 g/in$^3$<br>3% $SiO_2/Al_2O_3$ Binder<br>No Precoat<br>Calcined 400° C. | 50 |
| 6 | $Pd/Mn/Al_2O_3$<br>0.39 g/in$^3$ (70 g/ft$^3$ Pd)<br>No Precoat<br>Calcined 450° C. | 28 |
| 7 | I.W. $Pd/Mn/Al_2O_3$<br>0.69 g/in$^3$ (95 g/ft$^3$ Pd)<br>No Precoat<br>No Calcine (120° C. only) | 50 |
| 8 | Carbon<br>0.80 g/in$^3$<br>No Precoat<br>No Calcine (120° C. only) | 22 |
| 9 | Carulite 200<br>0.65 g/in$^3$<br>3% $SiO_2/Al_2O_3$ Binder<br>$Al_2O_3$ Precoat (0.25 g/in$^3$)<br>Calcined 450° C. | 38 |
| 10 | Carulite 200<br>0.70 g/in$^3$<br>2% Latex Binder<br>No Precoat<br>No Calcine (120° C. only) | 42 |
| 11 | I.W. $Pd/Mn/Al_2O_3$<br>0.59 g/in$^3$ (82 g/ft$^3$ Pd)<br>$SiO_2/Al_2O_3$ precoat (0.59 g/in$^3$)<br>No Calcine either Coat<br>(120° C. only) | 46 |
| 12 | Carbon<br>1.07 g/in$^3$<br>$Al_2O_3$ Precoat (0.52 g/in$^3$)<br>calcined to 450° C.<br>Topcoat not calcined<br>(120° C. only) | 17 |

EXAMPLE 5

100 g of Versal GL alumina obtained from LaRoche Industries Inc. was impregnated with about 28 g of Pt amine hydroxide (Pt(A)salt) diluted in water to about 80 g of solution. 5 g of acetic acid was added to fix the Pt onto the alumina surface. After mixing for half hour, the Pt impregnated catalyst was made into a slurry by adding water to make about 40% solids. The slurry was ballmilled for 2 hours. The particle size was measured to be 90% less than 10 microns. The catalyst was coated onto a 1.5" diameter by 1.0" length 400 cpsi ceramic substrate to give a washcoat loading after drying of about 0.65 g/in$^3$. The catalyst was then dried at 100° C. and calcined at 550° C. for 2 hours. This catalyst was tested for $C_3H_6$ oxidation at temperatures between 60 and 100° C. in dry air as described in Example 8.

Some of calcined $Pt/Al_2O_3$ sample described above was also reduced in 7%H2/N2 at 400° C. for 1 hour. The reduction step was carried out by ramping the catalyst temperature from 25 to 400° C. at a H2/N2 gas flow rate of 500 cc/min. The ramp temperature was about 5° C./min. The catalyst was cooled down to room temperature and the catalyst was tested for $C_3H_6$ oxidation as described in Example 8.

EXAMPLE 6

6.8 g of ammonium tungstate was dissolved in 30 cc of water and the pH adjusted to 10 and the solution impregnated onto 50 g of Versal GL alumina (LaRoche Industries Inc.). The material was dried at 100° C. and calcined for 2 hours at 550° C. The approximately 10% by metal weight of W on $Al_2O_3$ was cooled to room temperature and impregnated with 13.7 g of Pt amine hydroxide (18.3% Pt). 2.5 g of acetic acid was added and mixed well. The catalyst was then made into a slurry containing 35% solid by adding water. The slurry was then coated over a 400 cpsi, 1.5"×1.0" diameter ceramic substrate resulting, after drying, in having a catalyst washcoat loading of 0.79 g/in$^3$. The coated catalyst was then dried and calcined at 550° C. for 2 hours. The catalyst was tested calcined in C3H6 and dry air in the temperature range 60 to 100° C.

EXAMPLE 7

6.8 g of perrhenic acid (36% Re in solution) was further diluted in water to make 10 g percent perrhenic acid solution. The solution was impregnated onto 25 g of Versal GL alumina. The impregnated alumina was dried and the powder calcined at 550° C. for 2 hours. The impregnated 10 weight percent based metal of Re on $Al_2O_3$ powder was then further impregnated with 6.85 g of Pt amine hydroxide solution (Pt metal in solution was 18.3%). 5 g of acetic acid was added and mixed for a half hour. A slurry was made by adding water to make 28% solid. The slurry was ballmilled for 2 hours and coated onto 1.5" diameter×1.0" length 400 cpsi ceramic substrate to give a catalyst washcoat loading of 0.51 g/in$^3$ after drying. The catalyst coated substrate was dried at 100° C. and calcined at 550° C. for 2 hours. The catalyst was tested in the calcined form using 60 ppm $C_3H_6$ and dry air in the temperature range of 60 to 100° C.

EXAMPLE 8

The catalyst of Examples 5, 6 and 7 were tested in a microreactor. The size of the catalyst samples was 0.5" diameter and 0.4" length. The feed was composed of 60 ppm $C_3H_6$ in dry air in the temperature range of 25 to 100° C. The $C_3H_6$ was measured at 60, 70, 80, 90 and 100° C. at steady sate condition. Results are summarized in Table III.

TABLE III

SUMMARY RESULTS OF C3H6 CONVERSION

| Catalyst Name | $Pt/Al_2O_3$ Calcined (Ex. 18) | $Pt/Al_2O_3$ Calcined and Reduced (Ex. 18) | Pt/ 10% W/ $Al_2O_3$ Calcined (Ex. 19) | Pt/ 10% Re/ $Al_2O_3$ Calcined (Ex. 20) |
|---|---|---|---|---|
| % C3H6 Conversion @ | | | | |
| 60° C. | 0 | 10 | 9 | 11 |

TABLE III-continued

SUMMARY RESULTS OF C3H6 CONVERSION

| Catalyst Name | Pt/Al$_2$O$_3$ Calcined (Ex. 18) | Pt/Al$_2$O$_3$ Calcined and Reduced (Ex. 18) | Pt/ 10% W/ Al$_2$O$_3$ Calcined (Ex. 19) | Pt/ 10% Re/ Al$_2$O$_3$ Calcined (Ex. 20) |
|---|---|---|---|---|
| 70° C. | 7 | 22 | 17 | 27 |
| 80° C. | 20 | 50 | 39 | 45 |
| 90° C. | 38 | 70 | 65 | 64 |
| 100° C. | 60 | 83 | 82 | 83 |

It is clear from the Table that addition of W or Re oxide has enhanced the activity of the Pt/Al$_2$O$_3$ in the calcined form. The C$_3$H$_6$ conversion of the calcined Pt/Al$_2$O$_3$ was enhanced significantly when catalyst was reduced at 400° C. for 1 hour. The enhanced activity was also observed for the calcined catalyst by incorporation of W or Re oxides.

EXAMPLE 9

This is an example of preparing high surface area cryptomelane using MnSO$_4$. Molar ratios:KMnO$_4$:MnSO$_4$: acetic acid were 1:1.43:5.72 Molarities of Mn in solutions prior to mixing were:

0.44 M KmnO$_4$ 0.50 M MnSO$_4$ FW KMnO$_4$=158.04 g/mol FW MnSO$_4$.H$_2$O=169.01 g/mol FW C$_2$H$_4$O$_2$=60.0 g/mol The following steps were conducted:
1. Made a solution of 3.50 moles (553 grams) of KMnO$_4$ in 8.05 L of D.I. water and heated to 68° C.
2. Made 10.5 L of 2N acetic acid by using 1260 grams of glacial acetic acid and diluting to 10.5 L with D.I. water. Density of this solution is 1.01 g/mL.
3. Weighed out 5.00 moles (846 grams) of manganous sulfate hydrate (MnSO$_4$.H$_2$O) and dissolved in 10,115 g of the above 2N acetic acid solution and heated to 40° C.
4. Added the solution from 3. to the solution from 1. over 15 minutes while continuously stirring. After addition was complete, began heating the slurry according to the following heat-up rate:

| | |
|---|---|
| 1:06 pm | 69.4° C. |
| 1:07 pm | 71.2° C. |
| 1:11 pm | 74.5° C. |
| 1:15 pm | 77.3° C. |
| 1:18 pm | 80.2° C. |
| 1:23 pm | 83.9° C. |
| 1:25 pm | 86.7° C. |
| 1:28 pm | 88.9° C. |

5. At 1:28 pm approximately 100 mL of slurry was removed from the vessel and promptly filtered on a Buchner funnel, washed with 2 L of D.I. water, and then dried in an oven at 100° C. The sample was determined to have a BET Multi-Point surface area of 259.5 m$^2$/g and Matrix (T-Plot) surface area of 254.1 m$^2$/g.

EXAMPLE 10

This is an example of preparing high surface area cryptomelane using Mn(CH$_3$COO)$_2$. Molar ratios: KMnO$_4$:Mn(CH$_3$CO$_2$)$_2$: acetic acid were 1:1.43:5.72 FW KMnO$_4$=158.04 g/mol Aldrich Lot #08824MG FW Mn(CH$_3$CO$_2$)$_2$.H$_2$O=245.09 g/mol Aldrich Lot #08722HG FW C$_2$H$_4$O$_2$=60.0 g/mol 1. Made a solution of 2.0 moles (316 grams) of KMnO$_4$ in 4.6 L of D.I. water and heated to 60° C. by heating on hot plates.
2. Made up 6.0 of 2N acetic acid by using 720 grams of glacial acetic acid and diluting to 6.0 L with D.I. water. Density of this solution is 1.01 g/mL.
3. Weighed out 2.86 moles (700 grams) of manganese (II) acetate tetrahydrate [Mn(CH$_3$CO$_2$)$_2$.4H$_2$O] and dissolved in 5780 g of the above 2N acetic acid solution (in the reactor vessel). Heated to 60° C. in the reactor vessel.
4. Added the solution from 1. to the solution from 3. while maintaining the slurry at 62–630° C. After complete addition, gently heated the slurry according to the following:

82.0° C. at 3:58 pm 86.5° C. at 4:02 pm 87.0° C. at 4:06 pm 87.1° C. at 4:08 pm shut off heat then quenched the slurry by pumping 10 L of D.I. water into the vessel. This cooled the slurry to 58° C. at 4:13 pm. The slurry was filtered on Buchner funnels. The resulting filter cakes were reslurried in 12 L of D.I. water then stirred overnight in a 5 gallon bucket using a mechanical stirrer. The washed product was refiltered in the morning then dried in an oven at 100° C. The sample was determined to have a BET Multi-Point surface area of 296.4 m$^2$/g and Matrix (T-Plot) surface area of 267.3 m$^2$/g. The resulting cryptomelane is characterized by the XRD pattern of FIG. 20. It is expected to have an IR spectrum similar to that shown in FIG. 19.

EXAMPLE 11

Following is a description of the ozone testing method for determining percent ozone decomposition used in this Example. A test apparatus comprising an ozone generator, gas flow control equipment, water bubbler, chilled mirror dew point hygrometer, and ozone detector was used to measure the percent ozone destroyed by catalyst samples. Ozone was generated in situ utilizing the ozone generator in a flowing gas stream comprised of air and water vapor. The ozone concentration was measured using the ozone detector and the water content was determined utilizing the dew point hygrometer. Samples were tested as 25° C. using inlet ozone concentrations of 4.5 to 7 parts per million (ppm) in a gas stream flowing at approximately 1.5 L/minute with a dew point between 15° C. and 17° C. Samples were tested as particles sized to −25/+45 mesh held between glass wool plugs in a ¼" I.D. Pyrex® glass tube. Tested samples filled a 1 cm portion of the glass tube.

Sample testing generally required between 2 to 16 hours to achieve a steady state of conversion. Samples typically gave close to 100% conversion when testing began and slowly decreased to a "leveled off" conversation that remained steady for extended periods of time (48 hours). After a steady state was obtained, conversions were calculated from the equation: % ozone conversion=[(1-(ozone concentration after passing over catalyst)/(ozone concentration before passing over catalyst)]*100.

Ozone destruction testing on the sample of Example 9 showed 58% conversion.

Ozone destruction testing on the sample of Example 10 showed 85% conversion.

EXAMPLE 12

This example is intended to illustrate that the method of Example 10 generated "clean" high surface area cryptomelane for which the ozone destruction performance was not further enhanced by calcination and washing. A 20 gram portion of the sample represented by Example 10 was calcined in air at 200° C. for 1 hour, cooled to room temperature, then washed at 100° C. in 200 mL of D.I. water by stirring the slurry for 30 minutes. The resulting product was filtered and dried at 100° C. in an oven. The sample was determined to have BET Multi-Point surface area of 265 $m^2/g$. Ozone destruction testing on the sample showed 85% conversion. A comparison to the testing of the sample of Example 10 demonstrated that no benefit in ozone conversion was realized from the washing and calcination of the sample of Example 10.

EXAMPLE 13

Samples of high surface area cryptomelane were obtained from commercial suppliers and modified by calcination and/or washing. As received and modified powders were tested for ozone decomposition performance according to the method of Example 11 and characterized by powder X-ray diffraction, infrared spectroscopy, and BET surface area measurements by nitrogen adsorption.

EXAMPLE 13a

A commercially supplied sample of high surface area cryptomelane (Chemetals, Inc., Baltimore, Md.) was washed for 30 minutes in D.I. water at 60° C., filtered, rinsed, and oven-dried at 100° C. Ozone conversion of the as received sample was 64% compared to 79% for the washed material. washing did not change the surface area or crystal structure of this material (223 $m^2/g$ cryptomelane) as determined by nitrogen adsorption and powder X-ray diffraction measurements, respectively. However, infrared spectroscopy showed the disappearance of peaks at 1220 and 1320 wavenumbers in the spectrum of the washed sample indicating the removal of sulfate group anions.

EXAMPLE 13b

Commercially supplied samples of high surface area cryptomelane (Chemetals, Inc., Baltimore, Md.) were calcined at 300° C. for 4 hours and 400° C. for 8 hours. Ozone conversion of the as received material was 44% compared to 71% for the 300° C. calcined sample and 75% for the 400° C. calcined sample. Calcination did not significantly change the surface area or crystal structure of the 300° C. or 400° C. samples (334 $m^2/g$ cryptomelane). A trace of $Mn_2O_3$ was detected in the 400° C. sample. Calcination causes dehydroxylation of these samples. Infrared spectroscopy show a decrease in the intensity of the band between 2700 and 3700 wavenumbers assigned to surface hydroxyl groups.

EXAMPLE 14

The addition Pd black (containing Pd metal and oxide) to high surface area cryptomelane is found to significantly enhance ozone decomposition performance. Samples were prepared comprising Pd black powder physically mixed with powders of (1) a commercially obtained cryptomelane (the 300° C. calcined sample described in Example 13b) and (2) the high surface area cryptomelane synthesized in Example 10 calcined at 200° C. for 1 hour. The samples were prepared by mixing, in a dry state, powder of Pd black and cryptomelane in a 1:4 proportion by weight. The dry mixture was shaken until homogeneous in color. An amount of D.I. water was added to the mixture in a beaker to yield 20–30% solids content, thus forming a suspension. Aggregates in the suspension were broken up mechanically with a stirring rod. The suspension was sonicated in a Bransonic® Model 5210 ultrasonic cleaner for 10 minutes and then oven dried at 120–140° C. for approximately 8 hours.

The ozone conversion for the commercially obtained cryptomelane calcined at 300° C. was 71% as measured on the powder reactor (Example 13b). A sample of this product was mixed with 20 weight percent Pd black yielded 88% conversion.

The cryptomelane sample prepared as in Example 10 calcined at 200° C. had 85% conversion. Performance improved to 97% with 20 weight percent Pd black added.

What is claimed is:

1. A motor vehicle comprising:

an engine compartment;

at least one motor vehicle component selected from the group consisting of a radiator, an air conditioner condenser, and an air charge cooler, located in a flow pattern of ambient air passing through the engine compartment;

a pollutant treating device within the engine compartment located in proximity to the at least one motor vehicle component and in the flow pattern of the ambient air, for treating pollutants present in ambient air, the pollutant treating device comprising, at least one pollutant treating component comprising a pollutant treating composition, said pollutant treating component positioned in at least one normal flow pattern of the ambient air within the engine compartment for the purpose of removing pollutants from the ambient air and for returning the treated air to the atmosphere, wherein the pollutant treating composition is selected from the group consisting of a catalytic material, an adsorbent material and combinations thereof; and washing means for washing the pollutant treating device located in the engine compartment.

2. The motor vehicle of claim 1 wherein the catalytic material is selected from the group consisting of precious metals, base metals, compounds containing the same and combinations thereof.

3. The motor vehicle of claim 2 wherein the base metals are selected from the group consisting of manganese, vanadium, molybdenum, nickel, cobalt, copper and oxides thereof.

4. The motor vehicle of claim 1 wherein the adsorbent material is selected from the group consisting of alkaline earth metal oxides, activated carbon, zeolites and combinations thereof.

5. The motor vehicle as recited in claim 1 wherein the washing means for washing the pollutant treating device located in the engine compartment and is located to direct a washing fluid to the pollution treating device to wash the pollutant treating component.

* * * * *